United States Patent
Kumar

(10) Patent No.: US 10,600,105 B1
(45) Date of Patent: Mar. 24, 2020

(54) INTERACTIVE ELECTRONIC ASSIGNMENT OF SERVICES TO PROVIDERS BASED ON CUSTOM CRITERIA

(71) Applicant: Rajiv Kumar, Chino Hills, CA (US)

(72) Inventor: Rajiv Kumar, Chino Hills, CA (US)

( * ) Notice: Subject to any disclaimer, the term of this patent is extended or adjusted under 35 U.S.C. 154(b) by 0 days.

(21) Appl. No.: 16/543,402

(22) Filed: Aug. 16, 2019

Related U.S. Application Data

(63) Continuation-in-part of application No. 16/196,409, filed on Nov. 20, 2018, now abandoned.

(51) Int. Cl.
| | | |
|---|---|---|
| *G06Q 10/10* | (2012.01) | |
| *G06Q 30/02* | (2012.01) | |
| *G06Q 10/06* | (2012.01) | |
| *G06Q 30/06* | (2012.01) | |
| *G06N 20/00* | (2019.01) | |
| *G06Q 50/10* | (2012.01) | |

(52) U.S. Cl.
CPC ......... *G06Q 30/0627* (2013.01); *G06N 20/00* (2019.01); *G06Q 30/0282* (2013.01); *G06Q 30/0611* (2013.01); *G06Q 30/0637* (2013.01); *G06Q 50/10* (2013.01)

(58) Field of Classification Search
CPC ........... G06Q 30/0627; G06Q 30/0611; G06Q 30/0637; G06Q 50/10; G06N 20/00
USPC .......................................... 705/1.1–912, 347
See application file for complete search history.

(56) References Cited

U.S. PATENT DOCUMENTS

| | | | | |
|---|---|---|---|---|
| 10,089,585 B1* | 10/2018 | Alexander | ......... | G06K 9/00483 |
| 10,152,695 B1* | 12/2018 | Chiu | ...................... | G06F 16/248 |
| 2004/0059592 A1* | 3/2004 | Yadav-Ranjan | ..... | G06Q 30/018 |
| | | | | 705/315 |
| 2005/0033628 A1* | 2/2005 | Alverson | ................ | G06Q 10/06 |
| | | | | 705/7.28 |
| 2007/0239512 A1* | 10/2007 | Scott | .............. | G06Q 10/063112 |
| | | | | 705/7.14 |
| 2012/0109713 A1* | 5/2012 | Wilhite | ............... | G06Q 30/0609 |
| | | | | 705/7.32 |
| 2012/0123808 A1* | 5/2012 | Jones | ...................... | G06Q 10/10 |
| | | | | 705/4 |
| 2014/0164167 A1* | 6/2014 | Taylor | ................ | G06Q 30/0611 |
| | | | | 705/26.4 |
| 2014/0279352 A1* | 9/2014 | Schaefer | ................ | G06Q 40/04 |
| | | | | 705/37 |
| 2014/0297468 A1* | 10/2014 | Patterson | ........... | G06Q 30/0633 |
| | | | | 705/26.35 |
| 2015/0046193 A1* | 2/2015 | Harmon | ................. | G06Q 40/08 |
| | | | | 705/4 |
| 2015/0134387 A1* | 5/2015 | Heinonen | ...... | G06Q 10/063112 |
| | | | | 705/7.14 |

(Continued)

Primary Examiner — Jonathan P Ouellette
(74) *Attorney, Agent, or Firm* — Knobbe, Martens, Olson & Bear, LLP

(57) ABSTRACT

A service provider matching system can receive service provider data and preferences, customer data and preferences, and a customer request for service and determine matching scores for one or more matching service providers. Based on a threshold value, the service providers with a matching score above the threshold can be presented to a customer for selection. Upon selection by a customer, an assisted interaction can take place between the customer and one or more selected service providers to agree to particular terms related to a requested service, book a service appointment, and track the progress until completion.

20 Claims, 9 Drawing Sheets

(56) References Cited

U.S. PATENT DOCUMENTS

| | | | |
|---|---|---|---|
| 2016/0098802 A1* | 4/2016 | Bruffey | G06Q 40/08 |
| | | | 705/4 |
| 2016/0110801 A1* | 4/2016 | Steelberg | G06Q 50/167 |
| | | | 705/27.1 |
| 2017/0140323 A1* | 5/2017 | Laird | G06Q 10/063112 |
| 2017/0256012 A1* | 9/2017 | Buzalja | G06Q 50/188 |
| 2019/0108603 A1* | 4/2019 | Waslander | G06Q 50/163 |

* cited by examiner

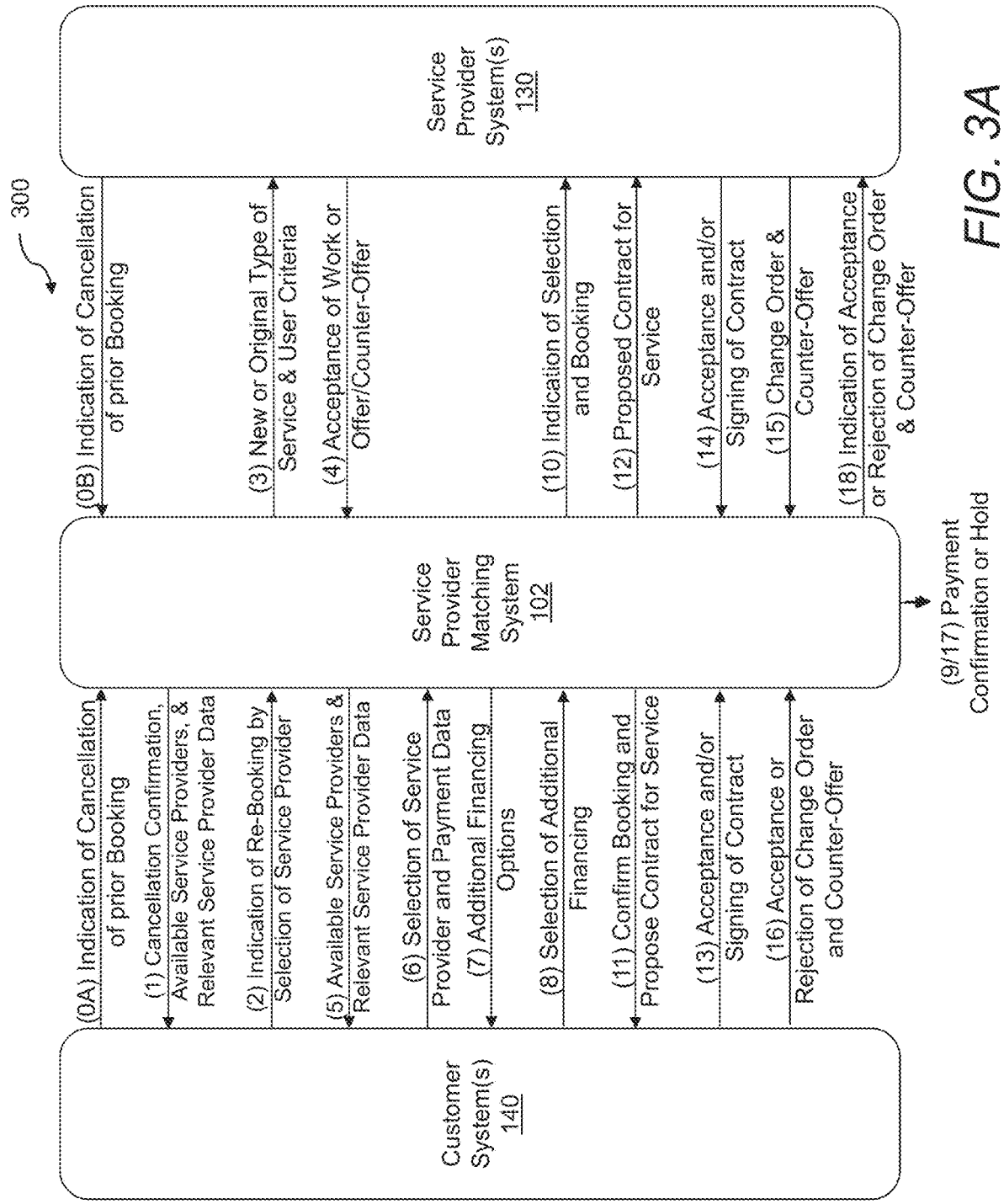

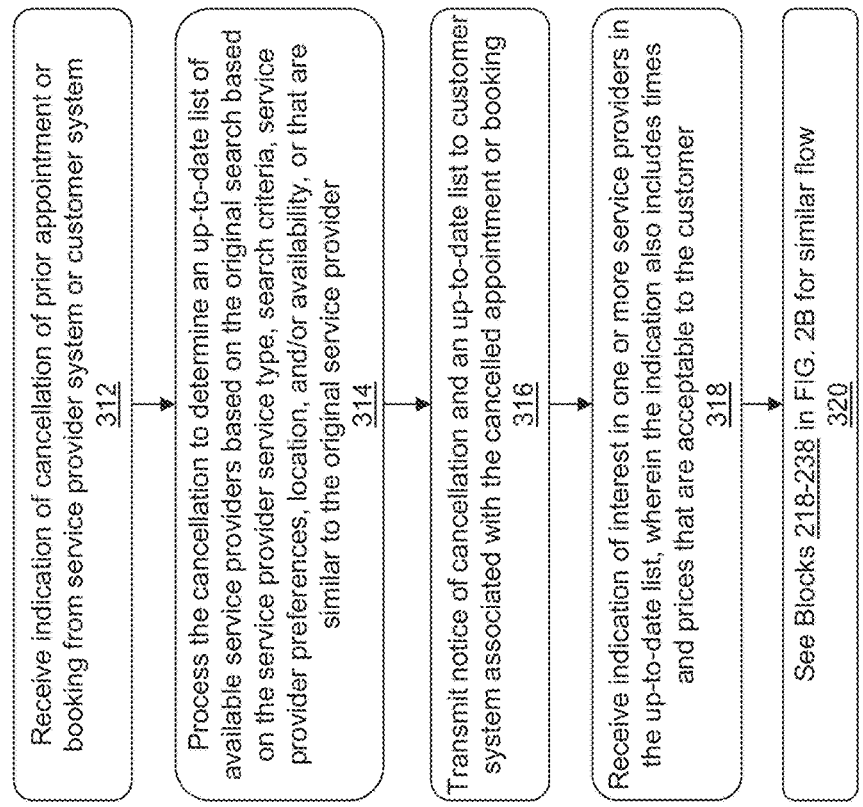

INTERACTIVE ELECTRONIC ASSIGNMENT OF SERVICES TO PROVIDERS BASED ON CUSTOM CRITERIA

INCORPORATION BY REFERENCE TO ANY PRIORITY APPLICATIONS

The present application is a continuation-in-part application of U.S. patent application Ser. No. 16/196,409, filed Nov. 20, 2018, the entire contents of which is hereby expressly incorporated by reference herein in its entirety and for all purposes. In addition, any and all applications for which a priority claim is identified in the Application Data Sheet as filed with the present application are hereby incorporated by reference under 37 CFR 1.57.

BACKGROUND

Many people, companies, government agencies, or the like (which may be referenced as example "customers" herein) often require a particular service provided by one or more people or companies. For example, such customers may require repairs performed by contractors or service providers. These customers typically have to search for a service provider through traditional sources (for example, the internet, yellow pages, referrals, or the like) to find someone to perform the repairs adequately and competently at a fair price, often using general search tools that are not tailored to locating such service providers. While some search services are available to assist a customer in locating service providers, many such services often fail to provide the information the customer needs to make an informed decision and would result in low quality work, expensive work, and/or unreliable work. For example, a service provider can fail to reasonably perform the needed repairs, charge an unreasonable fee, or take unreasonably long to perform the repairs. In some instances, the service provider is not licensed or does not carry insurance and exposes the customer to potential liabilities. Additionally, customers may also be victims to crime resulting from break-ins as a result of having an untrustworthy service provider working at their place of business or residence.

Also, payments and estimates can be an issue in such an arrangement. For example, timely payments may not be received by hired service providers, contractors, or subcontractors for materials used on a job. Customers also often make initial payments before having a written contract resulting in increased risk of a disagreement on an original agreement. This party financing for the service or liens may be filed against corresponding real property. In some instances, the property owner may have paid the service provider or contractor who then failed to pay subcontractors or material suppliers.

BRIEF DESCRIPTION OF THE DRAWINGS

FIG. 3A illustrates a swim-lane flow chart diagram illustrating functionality of an example service provider matching system, according to various embodiments of the present disclosure.

FIG. 3B illustrates a flow chart diagram illustrating functionality of an example service provider matching system based on FIG. 3A, according to various embodiments of the present disclosure.

FIGS. 4A-4C illustrate example graphical user interfaces of the service provider matching system from FIGS. 1, 2A-2B, and 3A-3B, according to various embodiments of the present disclosure.

DETAILED DESCRIPTION

Overview

Figure 1:
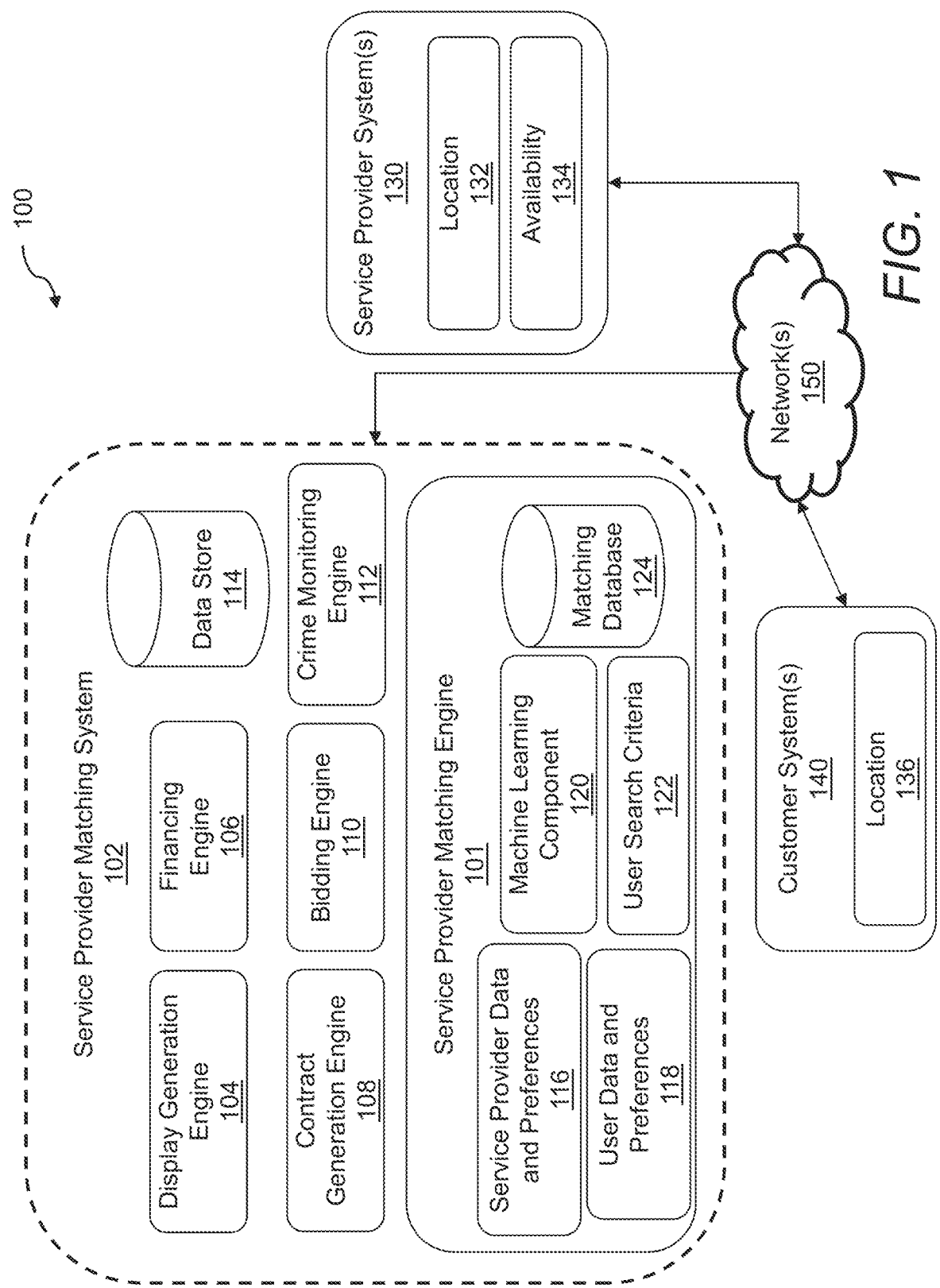
FIG. 1 illustrates an embodiment of a networked computing environment for implementing a service provider matching system, also illustrating how the components are in communication with each other, according to various embodiments of the present disclosure.

The present disclosure describes systems and methods that address the above and other needs through a variety of system features that will be described below, including generating user interfaces and implementing associated algorithms for matching customers to service providers based on relevant and custom criteria provided by the customer and the service provider. For example, some aspects of the disclosure include matching a relative location of a customer to a relative location of one or more service providers based at least in part on distance or the type and extent of the desired service. When services are contracted, a geographic location of the service provider may also be provided to the customer, such as via a user interface that presents service provider location data on a displayed map, to monitor the service provider s progress in real time, substantially real time, or updated manually or at particular time intervals (for example, every 0.1 seconds, 0.5 seconds, 1 second, 20 seconds, 30 seconds, 1 minute, 5 minutes, or the like). A proposed contract may also be generated by the system and provided to a customer and/or service provider based on a desired service and custom criteria provided by the customer and/or service provider. Additionally, payment history may be maintained related to each of the customers and can affect the customers' access to use the systems and methods described. For example, if payment is not timely or made at all, system access could be limited or blocked.

SUMMARY OF CERTAIN EMBODIMENTS

Aspects of the present disclosure include generating interactive user interfaces by which large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces that are useable and easily learned by humans is a non-trivial problem for software developers. The interactive and dynamic user interfaces described herein include improved human-computer interactions that may provide reduced mental workloads, improved decision-making, and/or the like, for a user. For example, user interaction with the interactive user interfaces described herein may provide an optimized display of potential matches and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some implementations there can be a computer-implemented method of generating and presenting interactive search results based on recommended service providers, the computer-implemented method comprising: providing, by a computer system to a customer system associated with a customer, a user interface that comprises functionality that enables the customer to search for and interact with service providers available for a particular service, and wherein the computer system comprises a computer processor and electronic memory; maintaining, by the computer system, one or more electronic data stores that store customer information relating to the customer; maintaining, by the computer system, one or more electronic data stores that store service provider information relating to a plurality of service providers, wherein service provider information for an individual service provider comprises a plurality of service provider data fields, wherein one or more of the plurality of service provider data fields identify criteria set by the individual service provider for accepting work requests from customers via the computer system; receiving, by the computer system based on user interaction with the user interface, electronic search data indicating search criteria for searching at least a subset of the plurality of service providers to perform a desired service, wherein the search criteria includes a plurality of search data fields; selecting, using the computer system, a set of service providers from the plurality of service providers, wherein at least one of the service provider data fields for each service provider in the set of service providers matches one of the search data fields; calculating, using the computer system, a base score for each of a plurality of search data fields for each service provider in the set of service providers, wherein the base score for an individual search data field represents a similarity between values associated with the individual search data field and a corresponding service provider data field; adjusting, using the computer system, the calculated base scores for each service provider in the set of service providers to generate adjusted base scores, wherein adjusting the base scores comprises at least one of (a) normalizing base scores or (b) applying one or more weights to the base scores based on relative importance of respective search data fields; calculating, using the computer system, a matching score for each service provider in the set of service providers, wherein calculating a first matching score for a first service provider is based at least in part on one or more adjusted base scores for the first service provider; determining, using the computer system, a set of recommended service providers comprising at least a portion of the set of service providers, the set of recommended service providers determined based at least in part on the calculated matching scores; causing display, via the user interface, of an interactive result set based at least in part on the set of recommended service providers, the interactive result set being determined and sorted based at least in part on the calculated matching scores; receiving, by the computer system via the user interface, a work request for work to be performed by a selected service provider from the recommended service providers; and sending, by the computer system in real time with respect to receipt of the work request, service request information to a first service provider system associated with the selected service provider, wherein the service request information includes at least a portion of the customer information relating to the customer.

In various embodiments, the above computer-implemented method may include one or more of the following features. The method may further comprise: wherein the relative importance of respective search data fields is determined based on user preferences associated with the customer. The computer-implemented method and can further comprise: receiving, using the computer system, an indication of payment-related data, wherein the payment-related data indicates method and form of payment for a service offered by the selected service provider; and transmitting, using the computer system, the indication of a selection to the first service provider system associated with the selected service provider. The above computer-implemented method can further comprise: wherein the selected service provider includes two or more service providers. The computer-implemented method can further comprise: generating, using the computer system, a contract based at least in part on the search criteria, service provider information, and customer information; transmitting, using the computer system, the contract to the customer system; and transmitting, using the computer system, the contract to the first service provider system. The computer-implemented method can further comprise: wherein the contract includes a plurality of contractual terms automatically selected or generated based on information associated with at least one of the customer, the selected service provider or the work request. The computer-implemented method can further comprise: receiving, using the computer system, indication of acceptance of the contract from the customer system; and receiving, using the computer system, indication of acceptance of the contract from the first service provider system. The computer-implemented method can further comprise: continuously receiving, by the computer system from the first service provider system, electronic data indicating a current physical location of the first service provider system; and causing display, via the user interface, of a geographical map including an indicator on the graphical map representing the current physical location of the service provider, wherein the current physical location is based at least in part on the received electronic data, and wherein the display is updated at a predetermined time interval to stay up-to-date so that a customer can view the current physical location to see when the selected service provider associated with the first service provider system should be ready to perform the desired service. The computer-implemented method can further comprise: receiving, using the computer system, indication of a change order request from the first service provider system; and transmitting, using the computer system, the indication of the change order request to the customer system. The computer-implemented method can further comprise: receiving, using the computer system, indication of acceptance of the change order request from the customer system; and transmitting, using the computer system, the indication of acceptance to the first service provider system. The computer-implemented method can further comprise: receiving, using the computer system, bid information from one or more service provider systems associated with one or more service providers, wherein the bid information includes a price to perform work associated with the received electronic search data, and wherein the interactive result set displayed on the user interface includes at least a portion of the bid information so that a customer can consider the bid information when making a decision on which service provider to select.

In some implementations, there can be a system for generating and presenting interactive search results based on recommended service providers, the system comprising: one or more electronic data stores comprising: electronic search data including a plurality of search data fields; customer information relating to a customer; and service provider information relating to a plurality of service providers, wherein service provider information for an individual service provider comprises a plurality of service provider data fields, wherein one or more of the plurality of service provider data fields identify criteria set by the individual service provider for accepting work requests from customers via the computer system; a networking interface; and a hardware processor is configured to execute computer-executable instructions in order to: provide, to a customer system associated with a customer, a user interface that comprises functionality that enables the customer to search for and interact with service providers available for a particular service, and wherein the computer system comprises a computer processor and electronic memory; receive customer information relating to the customer; receive service provider information relating to a plurality of service providers; receive, based on user interaction with the user interface, electronic search data indicating search criteria for searching at least a subset of the plurality of service providers to perform a desired service; select a set of service providers from the plurality of service providers, wherein at least one of the service provider data fields for each service provider in the set of service providers matches one of the search data fields; calculate a base score for each of a plurality of search data fields for each service provider in the set of service providers, wherein the base score for an individual search data field represents a similarity between values associated with the individual search data field and a corresponding service provider data field; adjust the calculated base scores for each service provider in the set of service providers to generate adjusted base scores, wherein adjusting the base scores comprises at least one of (a) normalizing base scores or (b) applying one or more weights to the base scores based on relative importance of respective search data fields; calculate a matching score for each service provider in the set of service providers, wherein calculating a first matching score for a first service provider is based at least in part on one or more adjusted base scores for the first service provider; determine a set of recommended service providers comprising at least a portion of the set of service providers, the set of recommended service providers determined based at least in part on the calculated matching scores; cause display, via the user interface, of an interactive result set based at least in part on the set of recommended service providers, the interactive result set being determined and sorted based at least in part on the calculated matching scores; receive, via the user interface, a work request for work to be performed by a selected service provider from the recommended service providers; and send, in real time with respect to receipt of the work request, service request information to a first service provider system associated with the selected service provider, wherein the service request information includes at least a portion of the customer information relating to the customer.

In various embodiments, the above system may include one or more of the following features. The system may further comprise: wherein the relative importance of respective search data fields is determined based on user preferences associated with the customer. The system can further comprise: wherein the matching score or the base scores are calculated using one or more machine learning algorithms. The system can further comprise: wherein the hardware processor is further configured to execute the computer-executable instructions in order to: receive an indication of payment-related data, wherein the payment-related data indicates method and form of payment for a service offered by the selected service provider; and transmit the indication of a selection to the first service provider system associated with the selected service provider. The system can further comprise: wherein the hardware processor is further configured to execute the computer-executable instructions in order to: generate a contract based at least in part on the search criteria, service provider information, and customer information, wherein the contract includes a plurality of contractual terms automatically selected or generated based on information associated with at least one of the customer, the selected service provider or the work request; transmit the contract to the customer system; and transmit the contract to the first service provider system. The system can further comprise: wherein the hardware processor is further configured to execute the computer-executable instructions in order to: receive indication of acceptance of the contract from the customer system; and receiving indication of acceptance of the contract from the first service provider system. The system can further comprise: wherein the hardware processor is further configured to execute the computer-executable instructions in order to: continuously receive, by the computer system from the first service provider system, electronic data indicating a current physical location of the first service provider system; and cause display, via the user interface, of a geographical map including an indicator on the graphical map representing the current physical location of the service provider, wherein the current physical location is based at least in part on the received electronic data, and wherein the display is updated at a predetermined time interval to stay up-to-date so that a customer can view the current physical location to see when the selected service provider associated with the first service provider system should be ready to perform the desired service. The system can further comprise: wherein the hardware processor is further configured to execute the computer-executable instructions in order to: receive bid information from one or more service provider systems associated with one or more service providers, wherein the bid information includes a price to perform work associated with the received electronic search data, and wherein the interactive result set displayed on the user interface includes at least a portion of the bid information so that a customer can consider the bid information when making a decision on which service provider to select.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/ or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Service Provider Matching System Diagram

FIG. 1 illustrates an embodiment 100 of a networked computing environment for implementing a service provider matching system. The computing environment may include a service provider matching system 102 for implementing a service provider matching engine 101 and other various systems and engines. The networked computing environment 100 can include one or more service provider systems 130 and one or more customer systems 140. The service provider systems 130 may communicate via a network 150 with the service provider matching system 102. The customer systems 140 may also communicate via a network 150 with the service provider matching system 102. Although only one network 150 is illustrated, multiple networks 150 may exist. In some embodiments, the service provider matching system can comprise multiple systems connected via a local area network or via the Internet. The components described herein are not meant to be exhaustive but only a sample of what components may be implemented. Some components may be combined and others may be removed or substituted with similar components.

Service Provider Matching System

In some embodiments, the service provider matching system 102 may include a display generation engine 104, a financing engine 106, a contract generation engine 108, a bidding engine 110, a crime monitoring engine 112, a service provider matching engine 101, and a data store 114. The service provider matching system 102 may communicate with customer system(s) 140 and service provider system(s) 130 over a network 150.

In some embodiments, the service provider matching system 102 can comprise multiple systems connected via a local area network or via the Internet. Also, in some embodiments the service provider matching system 102, or portions or components thereof, can be additionally or alternatively located on the customer system(s) 140 and/or service provider system(s) 130.

The service provider matching system 102 may include one or more service provider matching engines 101 enabling the matching of customers, service providers, and/or subcontractors (for example, other service providers). In some embodiments, a service provider matching engine 101 can host and maintain a matching database 124 configured to store information associated with the service provider matching engines 101 and the service provider matching system 102. The matching database 124 can include service provider data and preferences, user data and preferences, user search criteria and past user search criteria, generated contacts, executed contracts, matching data used to match service providers with customers or service providers with subcontractors, display instructions, financing data and options, crime monitoring results and criteria, service provider location and availability, or the like.

1. Display Generation Engine

In some embodiments, the service provider matching system 102 includes a display generation engine 104. The display generation engine 104 can generate instructions for displaying a user interface that can be interacted with by users utilizing the customer system(s) 140 and/or the service provider system(s) 130. In some embodiments, information associated with the instructions for displaying a user interface can be stored in a data store 114.

In some embodiments, the displays generated (either directly or indirectly by generated instructions transmitted to a device for executing) can include displays with interfaces configured to display information and receive information from a user of the customer system(s) 140 and/or the service provider system(s) 130. Some of the information that is included on the interfaces may be data collected or received from other devices. For example, the location 132 of a service provider system 130 may be included on a display appearing on a customer system 140.

2. Financing Engine

In some embodiments, the service provider matching system 102 includes a financing engine 106. The financing engine 106 can be configured to determine payment plans, third party financing, financing recommendations, and can process payments as configured. In some embodiments, information associated with the financing options can be stored in the data store 114.

In some embodiments, a user of a customer system 140, once a desired service and a service provider that provides such service are designated, can select how to pay for the service. For example, the user can pay with check, credit card, cash, bank routing and account numbers, bank log-in information, or the like. In some embodiments, the service provider matching system 102 can facilitate the payments and then provide a portion of the payments to the designated service provider at an appropriate time. In some embodiments, the service provider can facilitate payment. In some embodiments, a payment plan can be selected allowing a customer to pay costs in installments (for example, weekly, monthly, bi-monthly, or the like) until the debt is paid off.

In some embodiments, under certain conditions (for example, the cost exceeding a preconfigured threshold, the type of service, a customer with bad credit, a service provider's preference, a customer's preference, or the like, or a combination of various factors) varying options may be presented to a customer for paying for desired service(s). For example, if the cost of a service is very high then a payment plan option may be presented to the customer. Also, for example, if the cost of a service is very high, third party financing options may be presented to help the customer afford the cost of such service. In some embodiments, payment plan options or third party financing, or other such options may be hidden in a graphical user interface, grayed out in a graphical user interface, deactivated, and/or otherwise not permitted to be selected by a customer based on various conditions not being met. Conversely, in some embodiments, payment plan options or third party financing, or other such options may appear graphical user interface, activated, or permitted to be selected by a customer based on various conditions being met.

For services performed by a service provider, there may be problems securing payment. In some embodiments, the financing engine 106 can be programmed to address certain payment issues by processing payments ahead of a requested service, holding the processed payment in an escrow account, and distributing the payment to the service provider upon approval by the customer that the service has been satisfactorily completed.

In some embodiments, insurance for a contracted service can be offered to the customer or service provider associated with the specific contracted service. The insurance can cover the cost of not receiving payment from the customer or to replace or fix poor work performed by the service provider.

In some embodiments, the financing engine 106 can process referrals or referral fees. For example, a referral can be if a customer or service provider refers another service provider to an existing customer, a new customer, or another service provider (for example, to be used as a subcontractor), where the initial entity performing the referral may do no more work with respect to the needed service. In some embodiments, there can be a referral fee processed by the financing engine 106. In some embodiments, the referral fee can be a flat fee paid by the operator of the service provider matching system 102. In some embodiments, the referral fee can be a flat fee paid by the service provider receiving the benefit of the referral out of a contracted service resulting from the referral or a customer's payment for the contracted service. In some embodiments, a percentage (for example, 1%, 5%, 10%, 20%, or the like) can be subtracted from a customer's payment to the service provider receiving the benefit of the referral. For example, if a customer is referred from Plumber A to Plumber B and contracts with Plumber B for a $1000 project, Plumber A can receive 10% of the service, which would be $100. In some embodiments, the percentage can be based on the profits Plumber B receives as opposed to the gross customer payment. In some embodiments, the method of referral fee calculations can vary by service or the amount of the service. For example, there can be a minimum fee (for example, $10, 20$, $100, or the like) set combined with a percentage fee (for example, 5%, 10%, 20%, or the like) for anything that would be higher than the set minimum fee.

In some embodiments, a customer can deposit a retainer or advanced payment in a general account associated with the service provider matching system 102. In such cases, for example, the customer may receive a discount (for example, 1%, 3%, 5%, 10%, or the like) for services contracted through the service provider matching system 102 platform. In some embodiments, a customer can deposit a retainer or advanced payment in an account associated with a particular service provider. In such cases, for example, the customer may receive a discount (for example, 1%, 3%, 5%, 10%, or the like) for services contracted with the specific service provider.

3. Contract Generation Engine

In some embodiments, the service provider matching system 102 includes a contract generation engine 108. The contract generation engine 108 can be configured to generate terms or provisions of a contract or an entire contract to be used by a customer and service provider in connection with any requested service(s). In some embodiments, information associated with generated contracts or contract provisions can be stored in the data store 114.

In some embodiments, the service provider matching system 102 can generate contracts (or contract provisions) with the contract generation engine 108 based on a variety of factors. For example, the variety of factors can include:

user data, user preferences, service provider data, service provider preferences, financing methods selected or preferred by a user or service provider, the type of service, the total cost of the service, or the like. The resulting contract can then be adapted or revised based on further feedback from the customer and/or service provider. In some embodiments, a contract generated by the contract generation engine 108 can generate a contract or contract terms based on the type of service to be performed. For example, there can be general provisions used across the platform, there can be general provisions for each field or area of services (for example, plumbing, tutoring, electrical work, cleaning, or the like), there can be specific provisions for each service contracted for, or a combination.

In some embodiments, service providers or customers may already have contracts they would like to use when contracting for services. The service provider matching system 102 with the contract generation engine 108 can then generate and recommend essential, important, or recommended terms to include in such contracts prior to execution.

For services performed by a service provider, mismatched expectations can lead to dissatisfied customers and problems securing payment. Although the financing engine 106 can be programmed to resolve some issues by securing payment prior to the completion of a requested service and using an escrow account, there can still be dissatisfaction with the work that may be attributable to mismatched expectations. One solution implemented in certain embodiments, for example, is to generate a contract (or certain provisions of a contract to be included in another contract) and provide the contract to the service provider system 130 and/or the customer system 140 for review, revision, and execution. If either party is not satisfied with the contract terms, then they can propose edits and revisions. If either party is still not satisfied with the revisions, or they cannot agree on particular provisions, it may be a good indication to the parties to contract with someone else and avoid issues with the work and/or payment after the service is completed.

4. Bidding Engine

In some embodiments, the service provider matching system 102 includes a bidding engine 110. The bidding engine 110 can be configured to receive, process, and transmit bids related to various services offered by service providers between customer system(s) 140 and service provider system(s) 130.

In some embodiments, a customer can submit a request for a service to the service provider matching system 102. The request can be listed with additional details provided by the customer and/or automatically by the service provider matching system 102. Service providers can then review the listed requests, select one or more requests, and submit a proposal and bid for the selected request(s). In some embodiments, bids can include just a cost estimate. In some embodiments, bids can include itemized listing of costs and/or an example invoice for the requested service. A customer can then either accept or reject the bid. In some embodiments, information associated with the request for a service and bids can be stored in the data store 114.

In some embodiments, a customer can create a request for a service that specifies a time window (for example, 1 day, 1 week, 1 month, or the like) to accept bids. The bids can either be private and hidden or public and available for other service providers and/or customers to view. At the expiration of the designated time window, the lowest bid can be automatically selected by the service provider matching system 102. In some embodiments, a contract can be generated by the contract generation engine 108 as well and presented to the winning service provider and/or the customer. However, with some types of services, there may be an issue where the lowest bid included an error or was maliciously submitted. To resolve such issues, the lowest bid or lowest bids can be presented to the customer for manual selection so that the customer can ensure the bid is accurate and reflects the desired work.

In some embodiments, requests for a service and/or submitted bids can be analyzed by a machine learning component 120 described in more detail herein. The machine learning component 120 can analyze similar requests and/or bids based on a variety of factors (for example, location of the service, time of the service, parties involved, or the like) to determine whether or not the request or bid are reasonable or may need to be removed from the system or adjusted. In some embodiments, such requests or bids that are flagged by the machine learning component 120 can either be permanently removed and/or the corresponding user banned from accessing the platform (for example, temporarily or permanently), or the flagged request or bid can be presented back to the original submitter for revision. In some embodiments, flagged requests or bids presented to the original submitter can also include a recommended change to the submission.

In some embodiments, a customer can enter a request for a specific service on the service provider matching system 102 (for example, in the example user interface depicted in FIG. 4A) then various service providers can submit an offer price the service provider matching system 102 for the requested service. Then, the customer can view the various offers submitted by the service providers and select the service provider based on the offered price as well as the associated service provider's distance to the customer, license(s), insurance(s), reviews, and/or other factors.

5. Crime Monitoring Engine

In some embodiments, the service provider matching system 102 includes a crime monitoring engine 112. The crime monitoring engine 112 can be configured to receive or retrieve relevant crime data related to particular addresses, customers, or service providers. For example, such crime-related data can be received or retrieved from customer systems 140, service provider systems 130, third party systems, or from private or public crime record databases. In some embodiments, information associated with the crime monitoring can be stored in the data store 114.

In some embodiments, the crime monitoring data can be used to limit or block access to the service provider matching system 102 by the customer system(s) 140 and/or service provider system(s) 130 depending on the crime monitoring data. For example, if an employee of a service provider is found guilty of robbery or another serious crime, access to the platform can be limited for the service provider until it is shown that the employee is no longer employed by the service provider. In some embodiments, if a service provider has been found involved, directly or indirectly, in any criminal activity then the service provider can be blocked from accessing or using the service provider matching system 102. In some embodiments, the crime monitoring engine 112 may be configured to automatically analyze collected crime data in various neighborhoods or other geographic areas in order to detect correlations between addresses previously serviced by a given service provider and crimes occurring in the vicinity. For example, the crime monitoring engine 112 may apply pattern matching, machine learning algorithms and/or other automated methods to flag certain service providers as potentially involved in reported crimes, and may block such providers from future access to the service provider matching system.

In another example, if crime-related data shows that a customer has recently filed for bankruptcy, access to the service provider matching system 102 may also be limited (for example, projects under a specific threshold, or projects of a specific type may only be permitted) or blocked until resolution of the bankruptcy or some time (for example, 6 months, 1 year, 7 years, or the like) after the bankruptcy. In some embodiments, for example with respect to bankruptcy, other measures can be put in place to resolve such increased likelihood of potential issues. For example, a customer with a bankruptcy can provide a pre-payment for any services as opposed to paying after completion of a requested service.

6. Data Store

In some embodiments, the service provider matching system 102 includes a data store 114. In some embodiments, the data store 114 can store any data, preferences, or information that passes through the service provider matching engine 101. For example, the data store 114 can store information related to the service provider data and preferences 116, the user data and preferences 118, the user search criteria 122 (any prior searches for customers, for example), outputs or results from the machine learning component 120, or other data input or output from any of the components in the service provider matching engine 101. In some embodiments, the data store 114 can store any data, preferences, or information that passes through the service provider matching system 102 and the service provider matching system 102. In some embodiments, the matching database 124 can store any data, preferences, or information that is stored in the data store 114. For example, the matching database 124 can store information related to the display generation engine 104, the financing engine 106, the contract generation engine 108, the bidding engine 110, the crime monitoring engine 112, any data in the data store 114, or other data input or output from any of the components in the service provider matching system 102. For example, the data store 114 can store some or all of service provider data and preferences, user data and preferences, user search criteria and past user search criteria, generated contacts, executed contracts, matching data used to match service providers with customers or service providers with subcontractors, display instructions, financing data and options, crime monitoring results and criteria, service provider location and availability, and/or other data.

7. Service Provider Matching Engine

In some embodiments, the service provider matching system 102 includes a service provider matching engine 101. The service provider matching engine 101 can include service provider data and preferences 116, user data and preferences 118, a machine learning component 120, user search criteria 122, and a matching database 124. In some embodiments, the service provider matching engine 101 can be configured to process requests received from a customer system 140 and match the associated customer with a service provider. In some embodiments, the matching can be based on one or more of: service provider data and preferences 116, user data and preferences 118, and user search criteria 122. Also, in some embodiments, the matching can use a machine learning component 120 to improve matching over time based on the various inputs and criteria that is used for the matching. In some embodiments, the provider matching engine 101 and/or the service provider matching system 102 can match customers to service providers based on availability and calendar data associated with the customer and/or service provider and the type of service. For example, if a customer requests a 2-hour project, the provider matching engine 101 and/or the service provider matching system 102 can match a customer to a service provider at a recommended time that fits both the customer's and service provider's schedule based on their availability.

a. Service Provider Data and Preferences

In some embodiments, the service provider matching engine 101 includes service provider data and preferences 116. In some embodiments, the service provider data and preferences 116 can include data related to service providers, such as one or more of the following: types of services offered, default costs for services (if applicable), account login information, contact information, address(es), places of business, employees (if any), what services each employee can perform, certifications for each employee or for the company, insurance information, working hours (either as a business and/or for each employee, for example), predicted length of time for completing various types of services, uploaded calendar information, or the like. In some embodiments, the service provider data and preferences 116 can include preferences related to service providers, such as one or more of the following: preferred financing options, contract and contract terms preferences, preferred geographic area to perform services in (potentially further delineated by the service or employee, for example), location tracking preferences, preferred times to perform various services (by company or employee, for example), or the like. In some embodiments, such data and preferences can be stored in the matching database 124 or the data store 114, for example.

In some embodiments, service providers utilizing their service provider systems 130 can provide the data and preferences. For example, the service providers can provide their data and preferences through one or more of: a graphical user interface on an internet browser, through a graphical user interface on a mobile application, with fax, mail, telephone, or a combination of methods. In some embodiments, service providers can provide access or login information to third party services. For example, service providers can provide access to a calendar application so that the service provider matching engine 101 and/or the service provider matching system 102 can determine when a service providers may be available to perform a particular service based on the retrieved or received calendar.

b. User Provider Data and Preferences

In some embodiments, the service provider matching engine 101 includes user provider data and preferences 118. In some embodiments, the user data and preferences 118 can include data related to customers or users, such as one or more of the following: account login information, contact information, financial information (including credit card information bank account information, for example), address(es), contact information of people that may be overseeing any work done (if any), uploaded calendar information, or the like. In some embodiments, the user data and preferences 118 can include preferences related to customers or users, such as one or more of the following: preferred gender of service providers (this can be limited to select services, for example), preferred financing options, contract and contract terms preferences, preferred geographic area to select service providers based on (so that the service provider does not need to travel a far distance and risk delaying a booked service, for example), preferred times for services to be performed (this can be set by location as well, for example), or the like. In some embodiments, stored preferences for a customer may include relative weights that should be applied by the matching engine to various data types or fields when the engine attempts to match a service request of that customer to a provider. For example, preferences for a given customer may indicate that the particular customer highly values the rating of a service provider and is not particular price sensitive, such that the matching engine may heavily weight service provider rating and apply a low weight to affordability or price when finding a match for service requests from that customer. In some embodiments, such data and preferences can be stored in the matching database 124 or the data store 114, for example.

In some embodiments, customers utilizing their customer systems 140 can provide the data and preferences. For example, the customers can provide their data and preferences through one or more of: a graphical user interface on an internet browser, through a graphical user interface on a mobile application, with fax, mail, telephone, or a combination of methods. In some embodiments, customers can provide access or login information to third party services. For example, customers can provide access to a calendar application so that the service provider matching engine 101 and/or the service provider matching system 102 can determine when a customer may be available for a particular service based on the retrieved or received calendar.

c. Machine Learning Component

In some embodiments, the service provider matching engine 101 includes a machine learning component 120. The machine learning component 120 can be used to assist the service provider matching system 140 in matching service providers with customers. The machine learning component 120 can use one or more machine learning algorithms to generate one or more prediction models or parameter functions for the matching. The matching can be based on user search criteria 122, service provider data and preferences 116, user data and preferences 118, or other relevant information. For example, the matching can be based on custom user preferences, custom service provider preferences, customer system 140 location, service provider system 130 location, service provider place of business address, or the like. The machine learning component 120 can be configured to generate models that identify potential matches. One or more of these prediction models may be used to determine a likelihood of satisfaction of the customer, service provider, or both, based on a set of inputs.

For example, the machine learning component 120 can implement machine learning algorithms or AI to generate matching models that are executed by the service provider matching engine 101. The machine learning models can be used to identify service providers and/or customers and match the customers with service providers based on user search criteria 122, service provider data and preferences 116, user data and preferences 118, or other relevant information. Predictions can include customers or service providers that do not meet the explicitly defined user search criteria 122, service provider data and preferences 116, or user data and preferences 118, but might be similar to or close to such requirements.

A number of different types of algorithms may be used by the machine learning component 120 to generate the models. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learning component 120. For example, the models can be regenerated on a periodic basis as new information related to customers, service providers, completed or incomplete services rendered, payments made or not made, or the like is available to help keep the predictions in the model more accurate as the information evolves over time. The machine learning component 120 is described in more detail herein.

The machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of customer or service provider interaction data may be analyzed to generate models.

In some embodiments, a service provider matching system can receive service provider data and preferences, customer data and preferences, and a customer request for service and determine matching scores for one or more matching service providers, which may be based at least in part on a machine learning model in some embodiments. Based on a threshold value, the service providers with a matching score above the threshold can be presented to a customer for selection. In some embodiments, the matching scores can be based on various base scores calculated based on a comparison between individual attributes associated with a customer request and corresponding attributes associated with a service provider, which may then be normalized and/or otherwise adjusted, such as to assign respective weights to individual data fields based on likely importance to the customer.

For example, a service provider matching system can compare a requested service (for example, beginner guitar lessons) with a service offered by a particular service provider (for example, advanced guitar lessons) to calculate a base score for that comparison. Additional base scores can be calculated for each criterion included in the customer search. All the base scores can be normalized (or otherwise adjusted) and then combined by the service provider matching system to calculate a matching score for the particular service provider. For example, in one embodiment, a customer may either set preferences ahead of time or provide input via a search user interface that indicates the relative importance of different search criteria to the customer (e.g., that they value ratings of providers more highly than years of experience). The service provider matching system may then adjust one or more base scores for certain search fields up or down by applying one or more weights corresponding to the relative field importance as set by the customer or a system administrator. The matching scores can then be compared to a threshold value to determine which service providers to present to the customer associated with the submitted customer request. In some embodiments, the threshold value can be adjusted so that a set number of recommended service providers are included in the recommendation. In some embodiments, the threshold value can be configured for each type of service or general field of services.

d. User Search Criteria

Figures 4A, 4B:
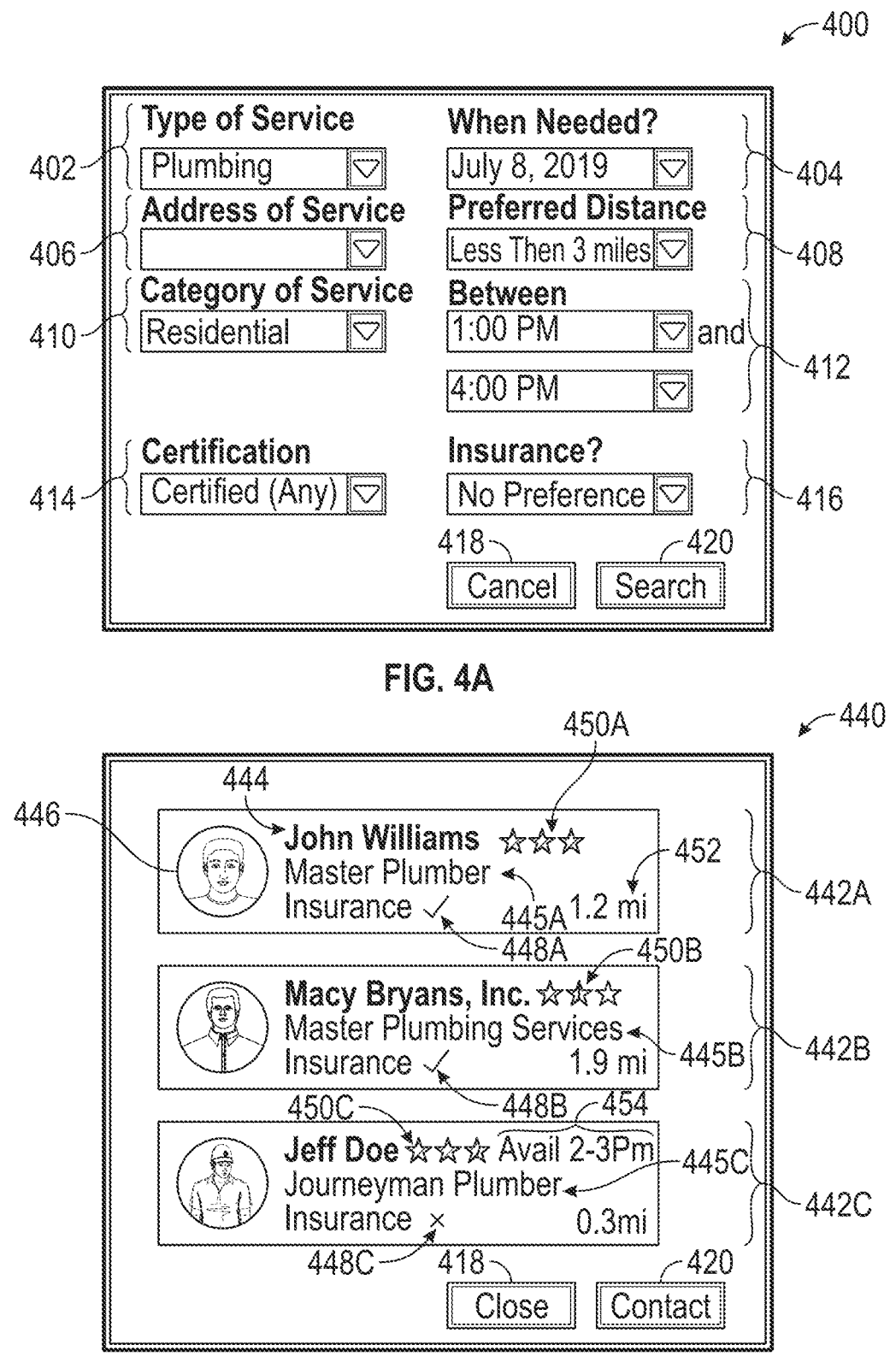
Figure 4C:
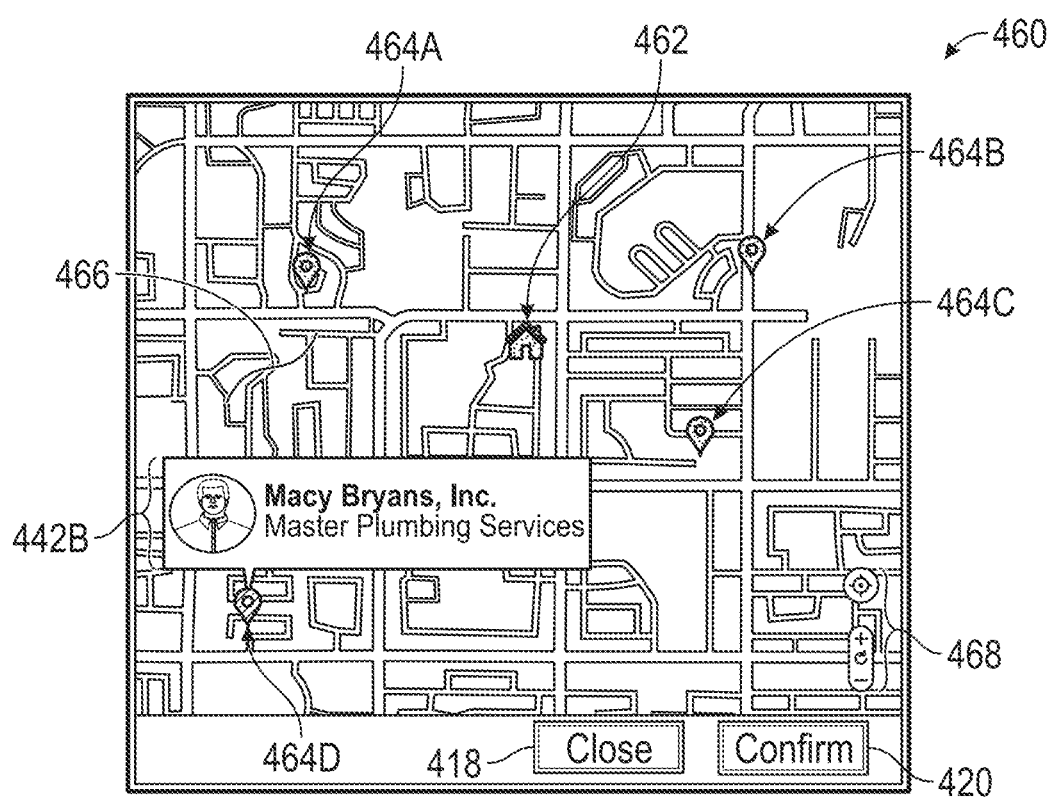

In some embodiments, the service provider matching engine 101 includes user search criteria 122. The user search criteria 122 that can include information related to a customer's search for a service provider. In some embodiments, the user search criteria 122 includes one or more of the following: type of service desired, address of where the service should take place, when the service is needed, whether the service is residential or commercial (this could affect hours or cost, for example), whether there free or paid parking on-site, a time or range of times when the service is desired to be started or completed, whether any certifications are required or preferred, whether the service provider is required to or preferred to have insurance for the service being performed, or the like. In some embodiments, some of the user data and preferences 118 can autofill portions of the search so that the user can enter information more quickly. In some embodiments, user data and preferences 118 can be used in conjunction with user-entered search criteria to run the search and match the user with service providers. In some embodiments, once all the user search criteria 122 is accepted and considered by the service provider matching engine 101, the service provider matching engine 101 can compare the user search criteria 122, which may include at least a portion of the user data and preferences 118, with at least a portion of the service provider data and preferences to determine one or more matches to present to the user associated with the search. FIGS. 4A-4C show one example of a search being entered on a graphical user interface and search results presented to a user.

e. Matching Database

In some embodiments, the service provider matching engine 101 includes a matching database 124. In some embodiments, the matching database 124 can store any data, preferences, or information that passes through the service provider matching engine 101. For example, the matching database 124 can store information related to the service provider data and preferences 116, the user data and preferences 118, the user search criteria 122 (any prior searches for customers, for example), outputs or results from the machine learning component 120, or other data input or output from any of the components in the service provider matching engine 101. In some embodiments, the matching database 124 can store any data, preferences, or information that passes through the service provider matching system 102 and the service provider matching system 102. In some embodiments, the matching database 124 can store any data, preferences, or information that is stored in the data store 114. For example, the matching database 124 can store information related to the display generation engine 104, the financing engine 106, the contract generation engine 108, the bidding engine 110, the crime monitoring engine 112, any data in the data store 114, or other data input or output from any of the components in the service provider matching system 102. In some embodiments, the matching database 124 can store information and algorithms related to prior searches, as well as results output from the machine learning component 120 that can be used to enhance future matches.

Service Provider System(s)

In some embodiments, the service provider system(s) 130 may include location data 132 and availability data 134. The service provider system(s) 130 may communicate with customer system(s) 140 and the service provider matching systems 102 over a network 150. In some embodiments, each service provider system 130 can comprise multiple systems connected via a local area network or via the Internet. Also, in some embodiments the service provider system(s) 130, or portions thereof, can be located on the service provider matching system 102. In some embodiments, the service provider systems 130 can include one or more computers, cell phones, tablets, a combination of devices, or the like.

1. Location

In some embodiments, the service provider system(s) 130 includes a location 132. The location 132 can include data that indicates the current and/or past physical locations associated with the service provider system(s) 130 or one or more service providers associated with the service provider systems 130. In some embodiments, the location 132 can be determined through the use of data related to one or more sensors in the service provider system(s) 130, which can include one or more of the following: GPS, WiFi, Bluetooth, barometer, or the like. In some embodiments, the location 132 can be determined by analyzing data related to the service provider system's 130 IP address. In some embodiments, the location 132 can be determined by analyzing manually input data. In some embodiments, location 132 can be tracked or monitored based on service provider data and preferences 116. For example, a service provider can limit the service provider matching system's 102 access to data associated with certain sensors or components in the service provider system 130.

2. Availability

In some embodiments, the service provider system(s) 130 includes an availability 134. The availability 134 can include data that indicates the current and/or future availability of one or more service providers associated with a service provider system 130. Availability may be stored as calendar information (such as available blocks of time on a given date, defined by start and stop times). Alternatively or additionally, availability could be stored as a Boolean value or flag indicating whether or not the service provider is currently on call or available for immediate service requests. In some embodiments, the availability 134 can be determined through the use of data related to one or more sensors in the service provider system(s) 130, which can include one or more of the following: GPS, WiFi, Bluetooth, barometer, or the like. For example, if a service provider is at a particular location 132 and is completing a project, then availability 134 can be based on the particular location 132. In some embodiments, the availability 134 can be determined by analyzing manually input data. In some embodiments, availability 134 can be tracked or monitored based on service provider data and preferences 116. For example, a service provider can limit the service provider matching system's 102 access to data associated with certain sensors or components in the service provider system 130.

Customer System(s)

In some embodiments, the customer system(s) 140 may include a location 136. The customer system(s) 140 may communicate with service provider system(s) 130 and the service provider matching systems 102 over a network 150. In some embodiments, each customer system 140 can comprise multiple systems connected via a local area network or via the Internet. Also, in some embodiments the customer system(s) 140, or portions thereof, can be located on the service provider matching system 102. In some embodiments, the customer system(s) 140 can include one or more computers, cell phones, tablets, a combination of devices, or the like.

In some embodiments, the customer system(s) 140 includes a location 136. The location 136 can include data that indicates the current and/or past physical locations associated with the customer system(s) 140 or one or more service providers associated with the service customer systems 140. In some embodiments, the location 136 can be determined through the use of data related to one or more sensors in the customer system(s) 140, which can include one or more of the following: GPS, WiFi, Bluetooth, barometer, or the like. In some embodiments, the location 136 can be determined by analyzing data related to the customer system's 140 IP address. In some embodiments, the location 136 can be determined analyzing manually input data, such as entry of a street address of the customer's home, business or other service location. In some embodiments, location 136 can be tracked or monitored based on user data and preferences 118. For example, a user can limit the service provider matching system's 102 access to data associated with certain sensors or components in the customer systems 140.

First Example of a Service Provider Matching Flow Chart and Swim Lanes

Figure 2A:
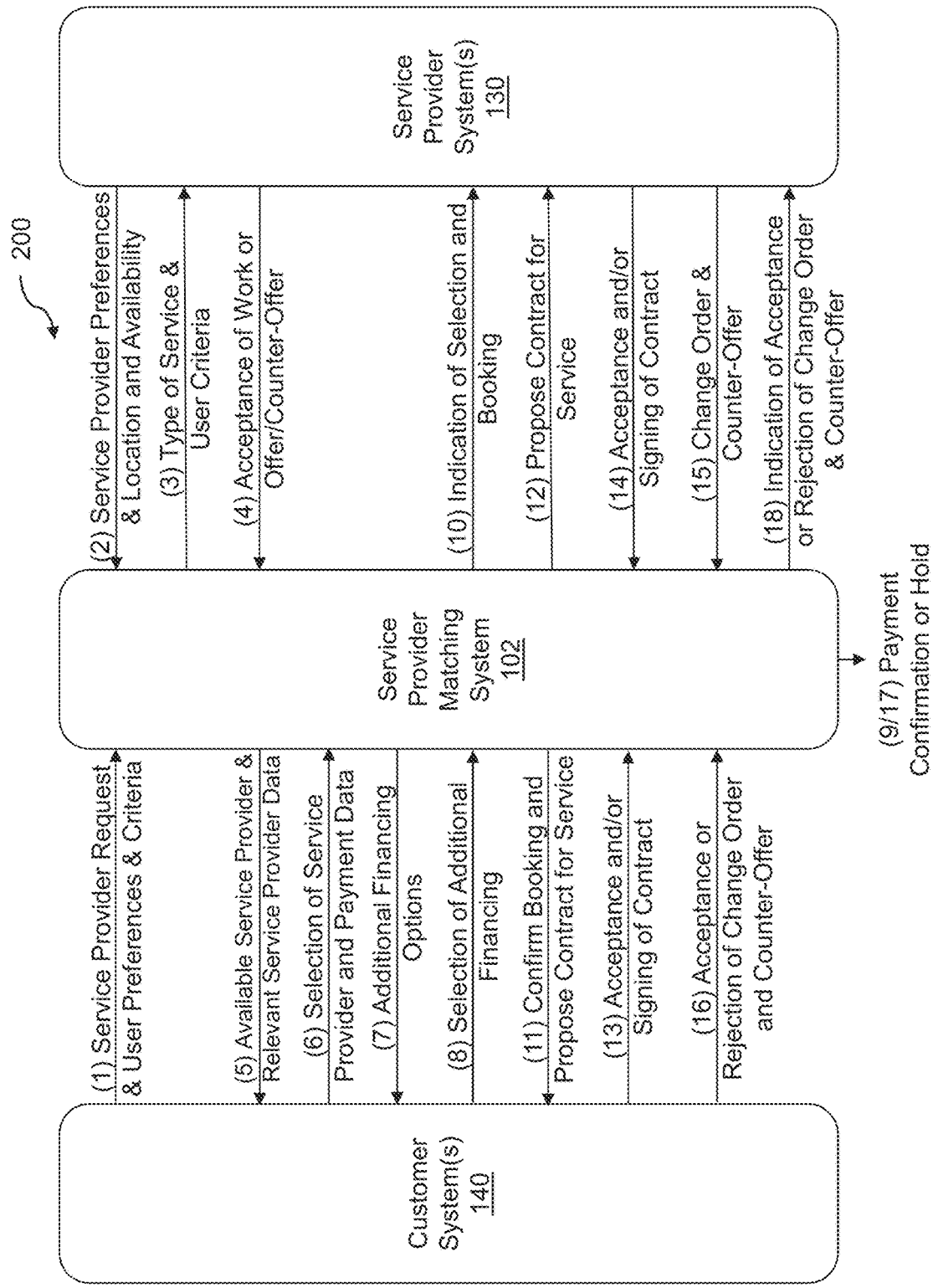
FIG. 2A illustrates a swim-lane flow chart diagram illustrating functionality of an example service provider matching system, according to various embodiments of the present disclosure.
Figure 2B:
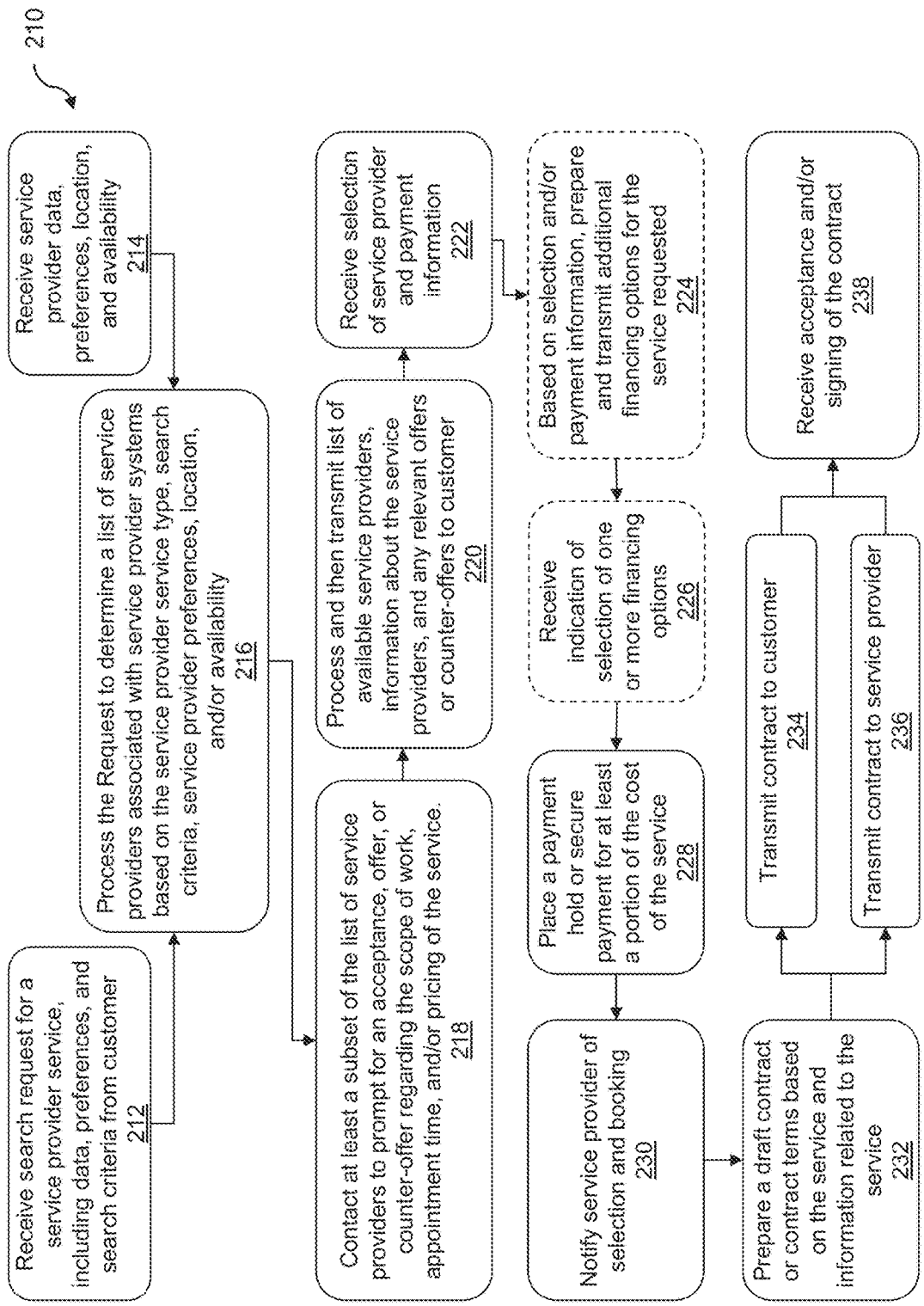
FIG. 2B illustrates a flow chart diagram illustrating functionality of an example service provider matching system based on FIG. 2A, according to various embodiments of the present disclosure.

FIGS. 2A-2B illustrate diagrams showing functionality of an example service provider matching system, according to various embodiments of the present disclosure. Although there is an order indicated in the Figures, it should be appreciated that the steps can occur in any order and certain blocks or steps can be optional, omitted, or combined with other blocks or steps. The customer system(s) 140 can be the same customer system(s) 140 described in FIG. 1 and herein, or a different system with different components. The service provider system(s) 130 can be the same service provider system(s) 130 described in FIG. 1 and herein, or a different system with different components. The service provider matching system 102 can be the same service provider matching system 102 described in FIG. 1 and herein, or a different system with different components.

1. First Example Swim Lanes

FIG. 2A illustrates a swim-lane flow chart diagram illustrating functionality 200 of an example service provider matching system, according to various embodiments of the present disclosure. In step 1, a customer system 140 can submit a request to be matched with one or more service providers to a service provider matching system 102. The request can include user data and preferences (for example, the user data and preferences 118 in FIG. 1), and search criteria data (for example, user search criteria 122 in FIG. 1).

In step 2, the service provider matching system 102 can also receive or retrieve service provider data and preferences (for example, service provider data and preferences 116 in FIG. 1), location (for example, location 132 in FIG. 1), and availability (for example, availability 134 in FIG. 1). Then the service provider matching system 102 can use the data received or retrieved from steps 1 and 2, along with any other data or methods, to match the customer system 140 associated with the submitted request to one or more service providers. In some embodiments, the provider preferences, location and/or availability can be received at different times or asynchronously with respect to the service provider request from the customer system. For example, a number of different service provider systems (which may include mobile computing devices, such as tablets or smartphones) may operate individual instances of an application associated with the service provider matching system that periodically (such as on a set schedule, on request, or in response to a location-change, schedule change or other trigger) provides to the service provider matching system updated current availability and/or location data of the associated service provider or individual employees or contractors of the given provider.

In step 3, the service provider matching system 102 can transmit to service provider systems 130 information indicating the type of service requested and any additional relevant information associated with the request (for example, at least a portion of the search criteria data and/or user data and preferences).

In step 4, at least a portion of the service provider systems 130 contacted can accept the work, communicate with the customer, propose an offer (or counter offer or counter proposal if the initial request had an offer), reject the work, or a combination. In some embodiments, certain service provider systems may establish preset automated rules implemented by the service provider matching system (such as enabling the service provider to automatically accept work requests for times that the service provider has marked as available and for which price, location and/or other criteria is met), such that acceptance of the work does not require manual review or input by certain service providers. Similarly, the service provider matching system may enable a service provider in advance to configure automated scripts, executable code or rule sets to automatically generate counter-offers in real time at step 4. For example, a service provider may indicate that service requests meeting certain criteria (such as in certain zip codes, for certain types of work, and/or other factors) should have a preset counter-offer sent to the customer system.

In step 5, the service provider matching system 102 can indicate to the customer system 140 associated with the request information related to which service providers responded from their corresponding service provider systems 130, or who have established automated rules indicating that they would accept the work request as originally requested or with automatically generated counter-offer terms. Information transmitted in step 5 can include a list of which service providers are available and interested in doing the work, any offers or counter-offers from service providers to do the work (for example, any proposed new times to perform the work, changes to the requested work, offers or counter-offers regarding consultation fees or project costs, or the like), and information related to the service providers (for example, certifications, name, location, contact information, insurance, general availability, specialties, ratings and reviews, or the like).

In step 6, the customer associated with the customer system 140 can select a service provider from the transmitted list in step 5. Once selected, information can be transmitted to the service provider matching system 102. Also, in step 6, the customer can provide payment data, instructions, and/or preferences to the service provider matching system 102.

In some embodiments, in step 7, depending on the provided payment data, instructions, and/or preferences, the service provider matching system 102 can optionally transmit proposed additional financing options (for example, from one or more third parties, from the selected service provider, from the company or person associated with the service provider matching system 102, a combination, or the like) to the customer system 140. For example, the service provider or a third party can provide a loan for at least a portion of the service cost to be paid back by the customer in installments. In some embodiments, additional financing may only be offered if the cost of a service exceeds a preconfigured threshold, if the service provider permits it, or if the customer associated with the customer system has sufficient credit (for example, based on a prior credit check and/or financial information provided). In some cases, a determination of whether a customer has sufficient credit can be based on output from the machine learning component 120 described in reference to FIG. 1, payment history, address of the work to be performed, a combination, or other similar factors.

In step 8, the customer can select one or more of the additional financing options or modify the provided payment data, instructions, and/or preferences in step 6. Once the financing and payment instructions are provided to the service provider matching system 102, then in step 9, the service provider matching system 102 can place a hold or charge some or all of the cost of the service, and/or an additional hold in case of any increased costs. In some embodiments, the amount charged or held can be based on the financing and payment instructions are provided by the customer, the type of work done, preferences or requirements of the service provider, or the like.

The service provider matching system 102 can then create a booking and indicate to the service provider system 130 in step 10 that the particular service provider has been selected by the customer and that payment has been processed. In some embodiments, the service provider matching system 102 (or other systems) can access calendar programs or services (for example, through APIs) associated with the customer or service provider and update the corresponding calendar programs or services with the confirmed booking appointment.

Once the booking is confirmed, the service provider matching system 102 can generate one or more proposed contracts, or contract terms. In some embodiments, the contracts or contract terms can be based on one or more of: customer data or preferences (for example, user data and preferences 118 as described in FIG. 1), service provider data or preferences (for example, service provider data and preferences 116 as described in FIG. 1), machine learning outputs (for example, output from the machine learning component 120 as described in FIG. 1), any search criteria provided by the customer (for example, user search criteria 122 as described in FIG. 1), the type of service to be completed, the contact information or addresses of the customer and/or service provider, any employees or designated parties provided to the service provider matching system 102 by the service provider or customer, financing or payment information agreed to by the parties, or the like.

In steps 11 and 12, the service provider matching system 102 can transmit the contracts or contract terms to the customer system 140 and the service provider system 130. In some embodiments, the contract generation and transmission can be omitted or optional. In some embodiments, the service provider matching system 102 can require execution of the contracts or terms prior to booking or confirming booking of the service, and in some cases, prior to charging any payment (in some embodiments, a hold on a credit card may still be processed to ensure a customer's capable of payment). For example, the contract or terms can be amended or executed electronically, also on paper and scanned, faxed, or mailed in, or through a third party service (for example, using an eSign service or software).

In steps 13 and 14, the customer and service provider can accept and/or sign the contract in the manner or form required by the parties or the service provider matching system 102. In some embodiments, use of the platform can automatically be presumed based on the terms of use or agreement of general contract terms.

In some embodiments, in step 15, the service provider may propose a change order, counter-offer, or new estimate based on an on-site inspection, or after the service has started, and the service provider anticipates increased costs. For example, the service provider may determine upon site inspection that work described in the original request did not accurately represent the scope of work to be completed. In some embodiments, the customer may also request additional work through the service provider matching system 102 as a change to the current booking or as a new and separate booking through the systems and methods described herein.

In step 16, the customer can accept or reject any change order or counter-offer received from the system. Also, in some embodiments, the customer can propose another counter-offer.

In step 17, the service provider matching system 102 can process the payment or hold similar to step 9 based on the newly agreed to cost of the service. In some embodiments, additional financing options (or updated financing options) can be presented to the customer similar to steps 7-8 described herein prior to step 17 being completed.

In step 18, which can optionally occur prior to step 17, the service provider can accept, reject, propose another change order or counter-offer, based on the customer's response in step 16. For example, the steps 15-18 can occur in varying orders and can repeat until the parties reach an agreement. Additionally, if a contract was signed by the parties, the service provider matching system 102 can update the contract or terms for resigning.

2. First Example Flow Chart

FIG. 2B illustrates a flow chart diagram illustrating functionality 210 of an example service provider matching system based on FIG. 2A, according to various embodiments of the present disclosure.

In block 212, a service provider matching system (for example, the service provider matching system 102 as described herein) can receive a search request for a service provider service. In some embodiments, the request can include data, preferences, search criteria from, and associated with, the customer (for example, from a customer system 140 as described herein). The data, preferences, and search criteria can include information used to indicate the type of service desired and specifics on a type of service provider, address, when to perform the service, contact information, and/or other information. For example, data, preferences, and search criteria can include information for the customer as described in FIGS. 1 and 2A, for example.

In block 214, the service provider matching system can receive service provider data, preferences, location, and availability. In some embodiments, the information can include data, preferences, search criteria from, and associated with, the service provider or its employee(s) (for example, from a service provider system 130 as described herein). The data, preferences, and search criteria can include information used to indicate the types of services offered, locations available to perform each service, availability to perform each service, address, contact information, and/or other information. For example, data, preferences, and search criteria for the service provider can include information as described in FIGS. 1 and 2A, for example.

In block 216, the service provider matching system can process the request received from the customer system the service provider matching system can determine a list of service providers. In some embodiments, the list of service providers can be determined based at least in part on one or more of: data received from the customer system (for example, any data, preferences, search criteria, or the like), data received from the service provider system (for example, any data, preferences or the like), credit score associated with the customer received or retrieved from a third party credit bureau, outputs from a machine learning component, any third party data retrieved or received through one or more APIs or uploads, or any other data that is received by or retrieved by the system that may be relevant for matching. In some embodiments, the matching can be determined similar to the systems and methods described in relation to FIG. 1 herein.

In block 218, the service provider matching system contacts at least a subset of the list of service providers to determine whether the service provider is available and/or interested in performing the requested service. In some embodiments, the contacting can include providing the service providers with information about the request or customer. In some embodiments, the service providers can do one or more of: accepting the requested work at a designated or predicted price, offering a price to do the service, offering a time to do the service, offering a location to do the service, offering a specific employee or employees to do the service, counter-offer any offers made by the customer, limitations on the scope of work, or the like. In some embodiments, the service provider can also include preferences for the work that can be considered by the service provider matching system for the present service and/or future services. In some embodiments, the requested service may need multiple service providers to complete the task. In some embodiments, a first service provider can hire a second service provider or subcontractor to perform the extra work that the first service provider cannot do. In some embodiments, the service provider matching system can combine two or more service providers and present the combined group to the customer for approval.

In block 220, the service provider matching system can process each service provider's response and transmit a list of service providers to the customer system. In some embodiments, the service provider matching system can combine the responses it received from service providers to compile a list of recommended services providers to present to the customer. In some embodiments, the list of service providers can include additional data about the service providers, relevant offers or counter-offers provided by the service providers, or additional information related to financing or the service that may be useful to the customer to make an informed decision about which service provider to select. In some embodiments, only a portion of the service providers contacted can be included in the list. For example, depending on the responses received from service providers, the list can include a portion of service providers that accepted the initial offer (as opposed to the service providers that provided a counter-offer). In some embodiments, all service providers contacted can be presented regardless of whether they responded.

In some embodiments, as discussed above, service providers can program criteria to automatically accept certain work. For example, service providers can designate an area, work schedule, and base price to perform services, and if a customer requests a service that meets the service provider's criteria, the service can be automatically booked without any interactions from the service provider. In some embodiments, the service provider can be informed of the booked appointment and subsequently cancel or propose a change to the booked appointment. In some embodiments, and others described herein, a change to a booking can incur a fee imposed on the party modifying the booking. In some embodiments, if the service provider accepts the work then the service provider matching system can immediately book the service and charge the client or put a hold on the client's credit card.

In block 222, the service provider matching system can receive a selection of a service provider and payment and financing information from a customer system. In some embodiments, the payment and financing information can include methods of payment and instructions related to how to secure payment of services and when to secure the payments. For example, a payment plan can be configured through the service provider matching system.

In block 224, depending on the type of service, cost of service, or other factors, the service provider matching system can compile and transmit additional financing options to the customer device. For example, if a customer sees a particular price and indicates that they cannot afford the service, the service provider matching system can present to the customer (for example, through a graphical user interface, application, email, text, or the like) options for additional financing through the service provider matching system, a third party, one or more of the matched service providers, a combination of financing methods, or the like.

In block 226, the service provider matching system can receive an indication of a selection by the customer of one or more financing options presented. In some embodiments, the consumer can propose a particular financing plan. In some embodiments, the consumer can select a plan presented to the customer.

In block 228, the service provider matching system can place a payment hold or charge payment for at least a portion of the cost of the service. In some embodiments, additional fees can be charged or held. For example, in some embodiments, if insurance is required by the customer and the customer does not have insurance, a certain value can be charged or held at the time of booking for any incidental costs and any remaining balance can be returned to the customer upon completion of the service, or upon approval by the service provider.

In block 230, the service provider matching system can notify a service provider of selection by a customer and confirm a booked appointment. Details about the booked appointment can be transmitted to the customer system and the service provider system.

In block 232, the service provider matching system can prepare a draft contract or contract terms and send the contract or terms to the customer and/or service provider. In some embodiments, the execution of the contract or terms can be required, optional, or partially required. In some embodiments, the contract or terms can be generated based on any data, preferences, information, or criteria related to the booked service, the customer, or the service provider(s).

In blocks 234 and 236, the contract or terms are transmitted to the customer and service provider. In block 238, the service provider matching system receives acceptance and/or signing of the contract or terms. In some embodiments, the acceptance of the contract can be electronic.

Second Example of a Service Provider Matching Flow Chart and Swim Lanes

FIGS. 3A-3B illustrate diagrams showing functionality of an example service provider matching system, according to various embodiments of the present disclosure. Although there is an order indicated in the Figures, it should be appreciated that the steps can occur in any order and certain blocks or steps can be optional, omitted, or combined with other blocks or steps. The customer system(s) 140 can be the same customer system(s) 140 described in FIG. 1 and herein, or a different system with different components. The service provider system(s) 130 can be the same service provider system(s) 130 described in FIG. 1 and herein, or a different system with different components. The service provider matching system 102 can be the same service provider matching system 102 described in FIG. 1 and herein, or a different system with different components.

1. Second Example Swim Lanes

FIG. 3A illustrates a swim-lane flow chart diagram illustrating functionality 300 of an example service provider matching system, according to various embodiments of the present disclosure. In steps 0A or 0B, the customer or service provider can indicate a cancellation of a prior booked service. In some embodiments, the cancellation may include the loss of a deposit or a fee that can either be transferred to the other party or to the operator of the service provider matching system (for example, the service provider matching system 102 described in FIG. 1). In some embodiments, when a service has been agreed to be performed by a customer and a service provider but must be cancelled by the service provider (for example, an accident occurred, sickness, or a current work not completed, or the like) and the service provider is not able to perform the service at the agreed upon time, then the service provider or the customer can cancel the booked service. In some embodiments, once the booking is cancelled, then contract can be reassigned to the next available and lowest cost service provider, or a new bid process can be started (for example, subject to customer approval).

In step 1, a cancellation confirmation can be sent to the customer system 140. In some embodiments, the cancellation confirmation can also include an up-to-date list of available service providers based on the initial booking information. The list can include matched service providers using the same information from the initial request, which can include user data and preferences (for example, the user data and preferences 118 in FIG. 1), and search criteria data (for example, user search criteria 122 in FIG. 1). In some embodiments, the list of available service providers can also include information about each service provider related to the type of service initially booked.

In step 2, the customer can indicate interest in re-booking the appointment by selecting one or more of the service providers on the list.

In step 3, the service provider matching system 102 can transmit to service provider systems 130 information indicating the type of service requested and any additional relevant information associated with the request (for example, at least a portion of the search criteria data and/or user data and preferences, or a history of prior bookings so that the service provider can understand the scope of the work and history of the customer).

Steps 4-18 are similar to steps 4-18 as described in reference to FIG. 2A. Descriptions in FIG. 2A can apply to the corresponding steps in FIG. 3A, except with the new booking information.

2. Second Example Flow Chart

FIG. 3B illustrates a flow chart diagram illustrating functionality 310 of an example service provider matching system based on FIG. 3A, according to various embodiments of the present disclosure. In block 312, the service provider matching system can receive an indication or a cancellation of a prior booked service. In some embodiments, the cancellation may include the loss of a deposit or a fee that can either be transferred to the other party or to the operator of the service provider matching system (for example, the service provider matching system 102 described in FIG. 1).

In block 314, the service provider matching system can process the cancellation to determine an up-to-date list of available service providers. In some embodiments, the up-to-date list of service providers can be determined based at least in part on one or more of: data received from the customer system (for example, any data, preferences, search criteria, or the like), data received from the service provider system (for example, any data, preferences or the like), credit score associated with the customer received or retrieved from a third party credit bureau, outputs from a machine learning component, any third party data retrieved or received through one or more APIs or uploads, or any other data that is received by or retrieved by the system that may be relevant for matching. In some embodiments, the matching can be determined similar to the systems and methods described in relation to other embodiments described herein.

It will be appreciated that the up-to-date list of available service providers may be service providers entirely unaffiliated (other than the service providers' use of the matching system's services) with the service provider that was subject to the cancellation. Accordingly, the cancelled and potential replacement service providers may each be separate independently operated businesses with their own separate service provider systems in different geographic locations, as opposed to merely different employees or contractors employed by or under direction of a single company.

In block 316, a cancellation confirmation can be sent by the service provider matching system to the customer system. In some embodiments, the cancellation confirmation can also include an up-to-date list of available service providers based on the initial booking information. The list can include matched service providers using the same information from the initial request, which can include user data and preferences (for example, the user data and preferences 118 in FIG. 1), and search criteria data (for example, user search criteria 122 in FIG. 1). In some embodiments, the list of available service providers can also include information about each service provider related to the type of service initially booked.

In block 318, the service provider matching system can transmit to one or more service provider systems information indicating the type of service requested and any additional relevant information associated with the request (for example, at least a portion of the search criteria data and/or user data and preferences, or a history of prior bookings so that the service provider can understand the scope of the work and history of the customer).

Block 320 includes at least a portion of the flow described in blocks 218-238 in reference to FIG. 2B. Descriptions for blocks 218-238 in FIG. 2B can apply to block 320 in FIG. 3B, except with the new booking information.

Graphical User Interface Examples for Customer System

FIGS. 4A-4C illustrate example graphical user interfaces of the service provider matching system from FIGS. 1, 2A-2B, and 3A-3B, according to various embodiments of the present disclosure. The graphical user interface can be presented on any device capable of displaying the interface (for example, desktops, laptops, tablets, phones, PDAs, or the like). In some embodiments, the graphical user interfaces may be generated by the service provider matching system 102 and sent to a customer system 140 for display and user interaction, while in other embodiments the user interfaces may be generated by a browser or application operating on a customer system 140. Elements shown in FIGS. 4A-4C include a subset of the possible combinations, placements, and orientations of data and it should be appreciated that additional information can be requested by the service provider matching system or entered/submitted by a customer system. Further, it should be appreciated that in some embodiments, less information can be requested by the service provider matching system.

FIG. 4A illustrates a service request 400 entry screen for a graphical user interface. The service request 400 can include drop down entry boxes for a customer to enter information associated with a service request 400. In some embodiments, various forms of entry can be provided. For example, the graphical user interface can include entry areas that can include one or more of: dialog boxes, free form entry, dropdown list, scroll wheel, check boxes, calendar to enter a date, clock to enter a time, an option to upload documents, or the like. In some embodiments, some or all of the entry areas can be optional or some or all of the entry areas can be required. In some embodiments, the service request 400 entry screen can auto-populate content based on previously received or retrieved data or information about the customer or services desired. For example, if a customer saved a "home" residence and previously classified the residence as a residential property, the category of service 410 can be auto-filled with "Residential" indicating that the property is a residential property. The service request 400 can include entry areas for data that can help the service provider matching system determine matches with service providers. The more information provided, the more appropriate the match can be, which can lead to an increased likelihood that a customer will select one or more of the matched service providers.

In entry area 402, a customer can enter the type of service to request. For example, the service can be for a plumbing job as displayed on the interface. Services can include any type of service that service providers using the platform choose to offer. In some embodiments, services can be listed in groups as a general field (for example, guitar lessons, plumbing, physical therapy, or the like) and later the customer can specify the particular scope of work (for example, beginner electric guitar lessons, re-piping a house, physical therapy for a leg). Accordingly, the displayed fields or areas in the user interface may dynamically change based on user input, such as automatically displaying an additional selection area. For example, user selection of an option for "pool service" in entry area 402 may cause an additional dropdown menu of types of pool service to be displayed (such as including options like "pool cleaning" and "heater/pump service"). In some embodiments, the specific field can be entered in entry area 402 and submitted with the request and machine learning can be applied to the request to determine the closest service provider matches.

In entry area 404, a customer can enter the date the service is needed in the future. In some embodiments, a set of dates can be provided to the service provider matching system.

In entry area 406, a customer can enter the address where the service is needed. In some embodiments, a the service provider matching system can auto-fill this box with a preferred or default address for the customer that the customer previously entered or an address that was retrieved from one or more third party services through an API, for example.

In entry area 408, a customer can enter the preferred radial distance from the address of service to run the search for service providers. For example, in some embodiments, service providers having a business address within the 3 mile radius would be searched. In some embodiments, service providers operating within that 3 mile radius, but that may have a business address outside of the 3 mile radius may also be included in the search.

In entry area 410, a customer can enter a category of service. In some embodiments, this may be useful to determine if additional requirements need to be met by the service providers. For example, with respect to some categories of service, requirements may include one or more of: permits, legal paperwork, insurance, number of people involved, types of tools or parts, or other legal requirements. In some embodiments, the category may not include any additional requirements, but may be indicative of customer preferences that can be used by a machine learning component to improve matching with service providers. For example, a business category customer may prefer a company that specializes in larger projects rather than an individual who specializes in smaller projects.

In entry area 412, a customer can enter a time range when the requested service would be needed or preferred.

In entry area 414, a customer can enter a preferred certification status of the service provider. In some embodiments, this box may not appear on the user interface if it is not applicable based on the service requested. In some embodiments, depending on the service requested, an indication of whether a certification is required, preferred, or neither can be provided by the customer. In some embodiments, a customer can select an actual listing of types of certifications applicable to the requested type of service.

In entry area 416, a customer can enter a preferred insurance status of the service provider. In some embodiments, this box may not appear on the user interface if it is not applicable based on the service requested. In some embodiments, depending on the service requested, an indication of whether service provider insurance is required, preferred, or neither can be provided by the customer. In some embodiments, a customer can select an actual listing of types of insurance applicable to the requested type of service.

Additionally, a confirm box 420 can be included to submit the request, and a cancel box 418 can be provided to close and/or cancel the search. In some embodiments, if the search is cancelled, the information can be saved and used to auto-populate the entry boxes on the service request 400 entry screen when the customer opens the user interface again.

Turning now to FIG. 4B, FIG. 4B illustrates a listing 440 of matched service providers based on the service request 400 submitted in FIG. 4A. The listing 440 can include service providers that match the customer's request within a certain threshold determined by the service provider matching system. FIG. 4 shows three matches 442A, 442B, 442C. The matches 442A, 442B, 442C include relevant information about the corresponding matched service providers. For example, the matches 442A, 442B, 442C include information about names (for example, 444), ratings 450A, 450B, 450C, classifications 445A, 445B, 445C, insurance status 448A, 448B, 448C, and distance 452 to the location the service or work is to be performed. In some embodiments, additional information can be included. For example, phone number, address, a description of the ratings, a description of the service provider, a description of the services offered, certifications, or any other relevant or desired information. In some embodiments, a customer can customize the view to view information they desire. In other embodiments, such as for services that are needed on an urgent basis, the user interface may additionally include an indication of the earliest estimated time that each service provider could arrive at the service location (which may be automatically determined based on current location of the service provider and their schedule, such as whether they're currently at another service appointment) and/or current real time location information of the service provider (or the service provider's nearest available agent or employee).

In some embodiments, the listing 440 of matched service providers can include all matched service providers determined by the service provider matching system. In some embodiments, the listing 440 of matched service providers can include a subset of the total matched service providers determined by the service provider matching system. In some embodiments, the service provider matching system can determine a ranking or order based on a matching score. The matching score can be a probabilistic value that indicates the certainty of a match, or the likelihood that the match will be selected by the customer that ran the corresponding search. The matching score can also be based on qualities of the service providers. For example, a higher score may be applied to service providers with higher ratings (for example, ratings 450A, 450B, and 450C), or to service providers who are closer in distance (for example, 452) to the address where the work is requested to be performed. In some embodiments, a customer can filter or sort the view based on any relevant factor. For example, a customer can sort by rating or distance to the service address.

In some embodiments, the names (for example, 444) included in the listing 440 can include the names of the matched service provider. For example, the name can include one or more of: the name of the individual service providers, a company name, the name of an employee that is designated for a particular service at a company, a company and employee name, or the like.

In some embodiments, ratings 450A, 450B, 450C can be included in the listing 440. For example, a star rating system can be displayed showing the average customer ratings for the particular matched listing. In some embodiments, customer ratings can be combined or supplemented with third party ratings downloaded or received from third party services (for example, Yelp, TripAdvisor, Google, or the like).

In some embodiments, classifications 445A, 445B, 445C can be included in the listing 440. For example, the classifications 445A, 445B, 445C can include the specific type of service or services, specialty, certification, or description of services offered by each matched service provider. The classifications 445A, 445B, 445C can help guide a customer to selecting the appropriate service provider that would be capable and competent to performing the desired service.

In some embodiments, insurance status 448A, 448B, 448C can be included in the listing 440. For example, depending on the type of service and/or the requirements included in the request in FIG. 4A, an indication of whether each matched service provider has an insurance policy, or offers insurance. Similarly, for example, depending on the type of service and/or the requirements included in the request in FIG. 4A, an indication of whether each matched service provider has one or more relevant certifications can also be indicated in the user interface.

In some embodiments, distance 452 to the location the service or work is to be performed can be included in the listing 440. For example, a value of the calculated travel distance (for example, by driving on roads or taking a direct path between two points) can be determined based on the service provider place of business address and the location the service is to be performed, as entered in FIG. 4A.

Turning now to FIG. 4C, FIG. 4C illustrates a map view 460 of matched service providers based on the listing 440 of service providers in FIG. 4B. In some embodiments, the map view 460 can display the listing 440 of matched service providers in addition to presenting the customer with the interface in FIG. 4B or in place of the interface in FIG. 4B. In some embodiments, a customer can indicate which view or views to be presented with based on a search request submitted in FIG. 4A, for example.

Map view 460 shows four matched service providers 464A, 464B, 464C, and 464D. Matched service provider 464D is selected and corresponds to matched service provider 442B from FIG. 4B. In some embodiments, information related to the matched service provider can be displayed, similar to the information displayed in FIG. 4B. In some embodiments, a portion of the information displayed in FIG. 4B can be displayed in FIG. 4C. Depending on the embodiment, the displayed locations on the map for the graphical indicators or icons of service providers 464A, 464B, 464C and 464D may correspond either to the place of business of the service provider or to a real-time location of a mobile device (such as a mobile phone or tablet device) or GPS tracking unit (such as a standalone tracking device or installed in a vehicle) associated with the service provider.

A location 462 where the work is to be performed can be indicated on the map view 460. In some embodiments, the location 462 can be determined based on the entered information in FIG. 4A associated with a submitted request for service. In some embodiments, the service provider matching system can track the location of the customer device submitting the request or accessing the system or platform to determine a location and place an estimated location on the map view 460 (if the request did not include an address, for example).

For example, if a customer saved a "home" residence and previously classified the residence as a residential property, the category of service 410 block can be auto-filled with "Residential" indicating that the property is a residential property.

Additional Example Embodiment

Figure 5:
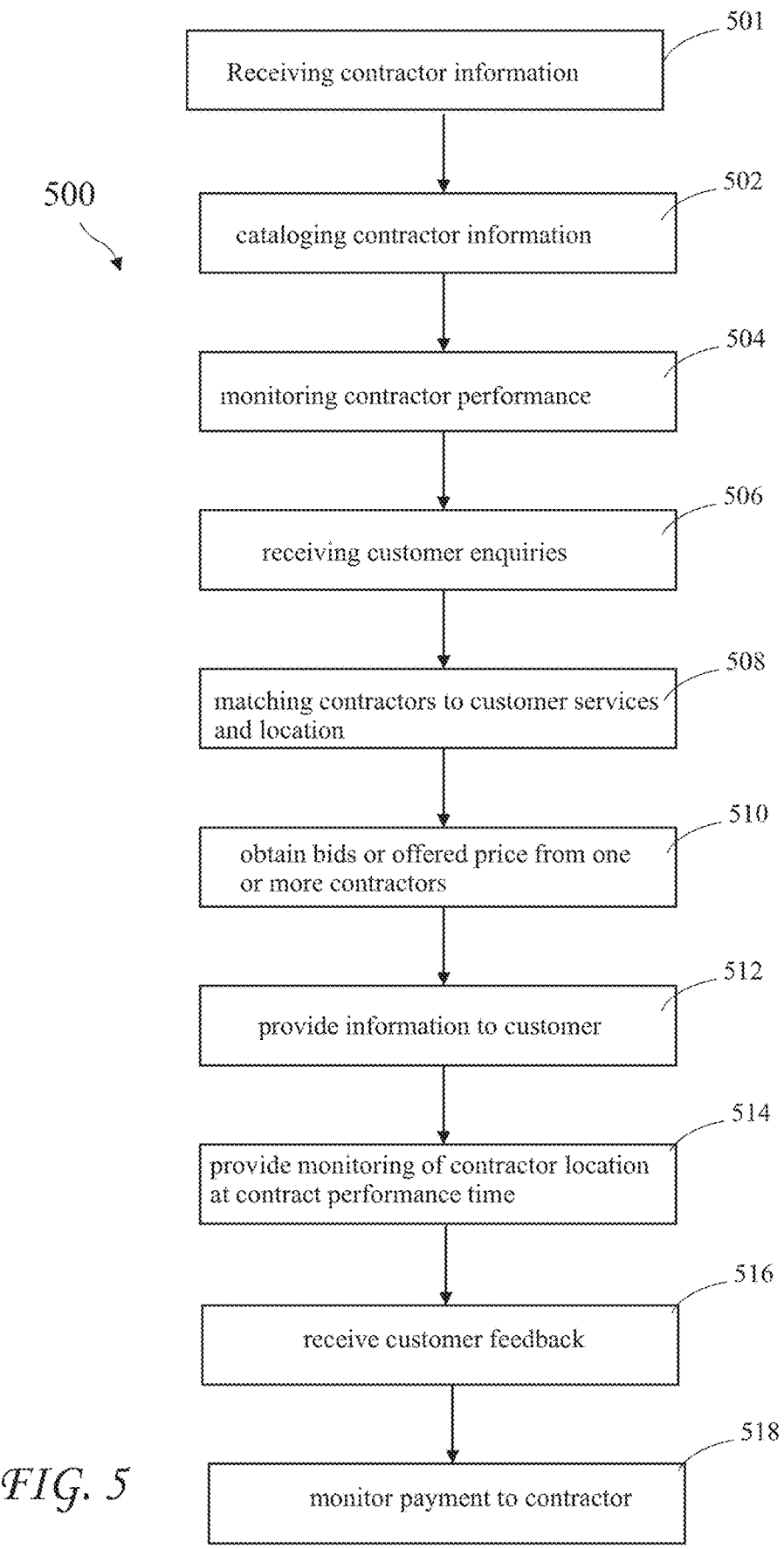
FIG. 5 is an exemplary method according to various embodiments of the present disclosure.

FIG. 5 is an exemplary method according to various embodiments of the present disclosure. A method 500 according to the present disclosure is shown in FIG. 5. The illustrative method may be performed, in one embodiment, by a service provider matching system, as described herein. The method includes receiving contractor information at step 501. The contractor information may include services offered, licenses, insurance, contractor location, credit history, or the like. In some embodiments, the contractor may further offer to provide either hourly rate based services, or fixed rate services and can offer a discount schedule based on time or location. The contractor information is cataloged at step 502. In some embodiments, the contractor performance is monitored at step 504. In some embodiments, the monitoring may include customer satisfaction with work, cost and/or completing time, and reports of erratic behavior, intoxication, any undesirable behavior, or the like. Further, criminal activity, for example break-ins, at the location of the service or near the location of the service, may be monitored to determine any correlation between a contractor service and later criminal activity.

Customer enquiries are received at step 506. In some embodiments, the customer enquiries may include both the services desired, customer location, any urgency, for example, plumbing leaks or electrical issues, a range of acceptable costs, or the like. Further, in some embodiments, some customers prioritize quick service and other prioritize cost, an option may be provided to request immediate service, or service within some time period. In some embodiments, the request may also include an upper limit to a cost the customer is willing to accept.

Service providers are matched to services and customer location at step 508. The matching may include matching the service providers or contractors having service provider locations close to services location for small services and matching service providers not as close to the services location for more expensive services, and matching the service providers having service provider locations close to the services location for services requiring heavy equipment and matching service providers not as close to the services location for the services not requiring heavy equipment. In some embodiments, service providers may be matched based on the nearest service provider to the customer location and then the next nearest to the customer location, giving the customer the option to contact the nearest service provider first if his credit history and other need matches with customer request.

Bids are obtained from service providers at step 510. The bids may include discounts for customers not requiring immediate service, for example, a smaller 10% discount if the service can be provided within the next two weeks, or a larger 20% discount if the service can be provided within the next month, allowing the service provider to optimize travel, application of resources, and or reducing the cost of materials. Service providers may also bid to provide materials required for use with the service or only the service if the customer obtains the materials.

Service provider information is provided to the customer at step 512. The service provider information may include service provider bids, service provider locations, service provider license status, and information on need for insurance based on service type, for example, injury to service provider employees or damage to neighboring property. Bids above the Customer limit will not be forwarded to the customer, in one embodiment. The service provider's credit history may also be provided to the customer. The service may further offer financing options, including the service providing financing, and $3^{rd}$ party lenders providing financing.

Recommendations to require the contactor to add the customer as an addition insured to the service provider's policy may be recommended, and evidence of the insurance provided to the customer. Additional insurance coverage may be offered from the referral service provider or from an outside insurance agency at nominal rates. A boilerplate contract may also be provided with the service provider information. Insurance covering mechanic's liens may also be provided when the customer pays the service provider, but the service provider fails to pay subcontractors or for material.

A contract between the customer and service provider may also include liquidated damages applied to either the customer or service provider should they breach the contract through delays of failures to perform the contract, or cancel the contract.

Service provider location at contract performance time may be monitored at step 514. The monitoring may include providing service provider location information and/or notifications to the customer if urgent repairs are needed and service provider is not local. The monitoring may also include tracking service provider schedule and location and sending alerts to the customer if the service provider will be late, and providing options to select a different service provider.

Customer feedback is received at step 516 including timeliness of the services. Payments to service providers are monitored in step 518. Services may be suspended to non-paying customers and service providers may be alerted to non-paying customers.

While the disclosure herein has been described with respect to specific embodiments and applications thereof, numerous modifications and variations could be made thereto by those skilled in the art without departing from the scope of the disclosure set forth in the claims.

Notification Module

In some embodiments, an alert and/or notification can automatically be transmitted to a user device based on interactions with the service provider matching system (for example, service provider matching system 102). For example, if a particular user runs a search, modifies a project, opens a resource or file, or performs any particular action that would be relevant for another user, an alert and/or notification can be generated. The alert and/or notification can be transmitted at the time that the alert and/or notification is generated or at some determined time after generation of the alert and/or notification. When received by the user device, the alert and/or notification can cause the device to display the alert and/or notification via the activation of an application on the device (e.g., a browser, a mobile application, etc.). For example, receipt of the alert and/or notification may automatically activate an application on the user device, such as a messaging application (e.g., SMS or MMS messaging application), a standalone application (e.g., a data analysis application), or a browser, for example, and display information included in the alert and/or notification.

If a user device is offline when an alert and/or notification is transmitted, the application may be automatically activated when the user device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

API Module

Various third-parties operate electronic services systems. In some instances, these systems may allow access through Application Programming Interfaces (APIs). Typically, each API requires its own set of information about a data object. Advantageously, embodiments of the present disclosure may collect information related to a data object, form API requests in the format and containing the information required by the API of each third-party ("third-party format"), collect responses from the API of each third-party, translate the different results back into a uniform format that facilitates comparison, storage and/or processing ("common format"), and show the results to the user. For example, different third-parties may require different types of information, and in different format.

Advantageously, rather than presenting the user with different third-parties' requests to provide different information repeatedly, the system may retrieve the required information from its database and automatically convert it into the format expected by the third-party. Advantageously, the system may then also convert the individual responses received from each API, which may again be in a third-party-specific format, into a common format that may facilitate comparison by the user. Similarly, various embodiments may use external APIs to access other services.

ADDITIONAL IMPLEMENTATION DETAILS AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
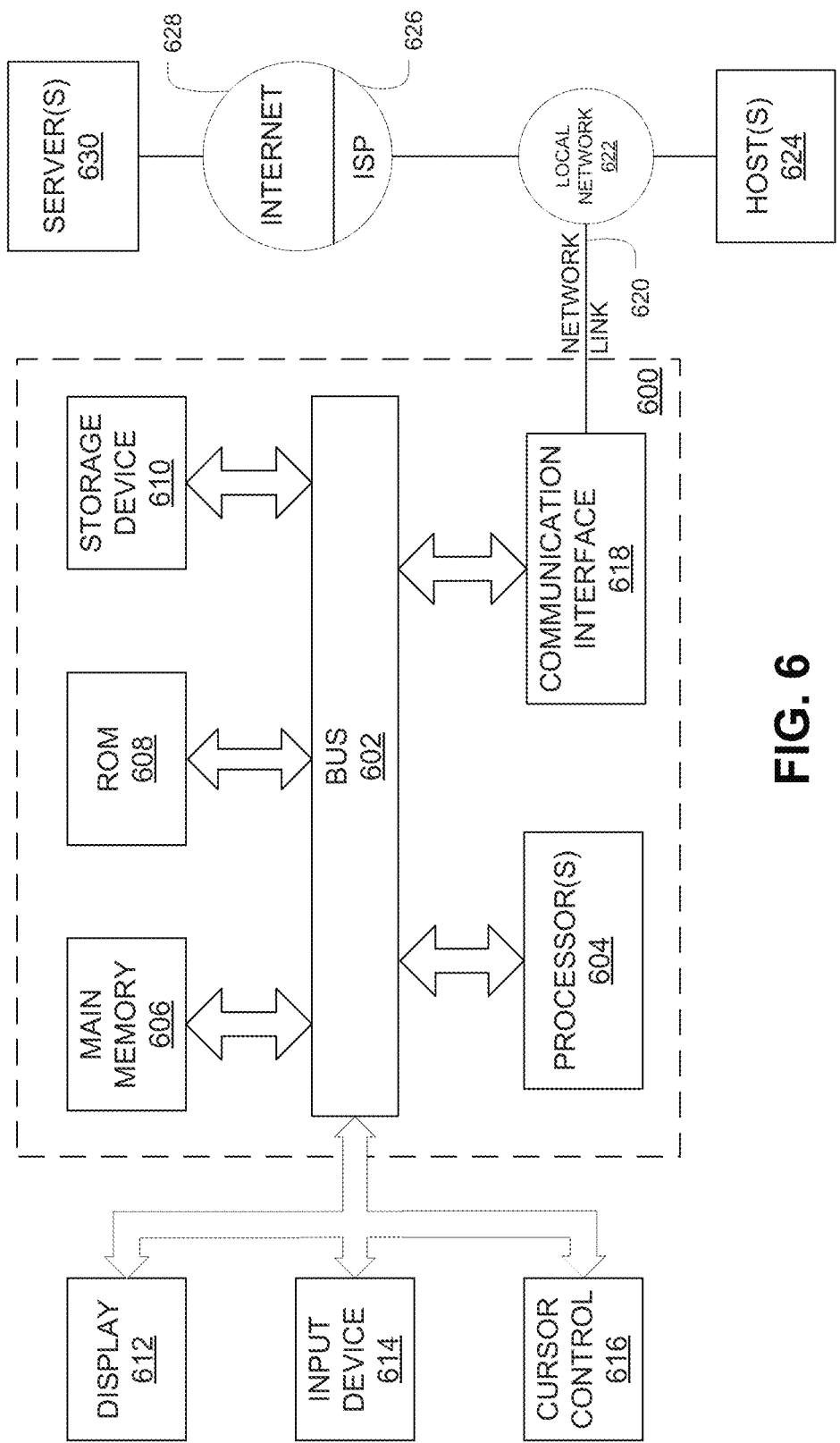
FIG. 6 illustrates a computer system with which certain methods discussed herein may be implemented.

For example, FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediary information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the Internet 628. Local network 622 and Internet 628 both may use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible to a user, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the disclosure described herein may be embodied within a form that does not provide all of the features and benefits set forth herein, as some features may be used or practiced separately from others. The scope of certain embodiments disclosed herein are indicated by the appended claims rather than by the foregoing description. All changes which come within the meaning and range of equivalency of the claims are to be embraced within their scope.

ADDITIONAL DESCRIPTION

In accordance with one aspect of the disclosure, there is provided a service provider referral service for any kind of service industry. In other embodiments, the service provider referral services may be targeted to one or more specific subsets or types of services. In various embodiments, the service providers described herein may include providers of any or all of the following example services, though less than these or others may be offered in different embodiments:

Home and commercial repair services including: electrician services; home electronics repair services; handyman services; woodwork services; painting services; plumber services; window and glass door repair and replacement services; landscaping services; tree trimming services; concrete repair and replacement services; air conditioning repair and replacement services; swimming pool construction services; repair services; mobile locksmith services; graffiti removal & abatement services; home-entertainment installation services; mortgage/debt-reduction services; pool services; lawn care services; home-inspection services; house painting services; local moving services; house-sitting services; home decorating services; mini blind cleaning services; pet-food and supplies home delivery services; custom closet systems services; window washing services; residential cleaning services; and cleaning services.

Personal services including: transportation services; Healthcare services; media services; advertising services; insurance: mobile pet grooming services; collectibles search services; diaper delivery services; dry-cleaning pickup & delivery services; golf-club cleaning services; self-defense instructor services; adventure tours services; pet sitting services; court-paper serving services; mobile massage services; mobile mechanic services; personal chef services; seamstress/tailor services; mystery shopping services; tax-form preparer services; wedding-guide publishing services; mobile car-wash and detailing services; used-car inspection services; professional organizer services; power washing services; windshield repair services; and private investigation services.

Business services including: business-plan consulting services; packing and unpacking service services; business-travel management services; carpet dyeing services; hospital-bill auditing services; specialized staffing services; bookkeeping services; computer repair services; referral services; freight brokerage services; video brochure services; executive search services; computer consulting services; long-distance reselling services; limousine services; office-relocation services; language translation services; office plant maintenance services; professional office consultant services; office-support services; copyright and proofreading services; direct mail/coupon services; public-relations agency services; mailing services; sales training services; and welcoming services.

Computer and technology services including: computer repair services; computer consulting services; internet research services; and Website designer services.

Children's services including: children's party planning services; child care services; child-identification program services; children's fitness services; children's transportation services; baby-proofing services; computer training for kids services; nanny placement services; new mother/infant home care services; and tutoring services.

Event services may including: photography services; errand runner/personal shopper services; family-history video services; mobile disc jockey services; wedding-planning services; event planning services; limousine service: photo birth announcements services; videotaping service; and reunion organizing services.

Health related services including: health care and social assistance services; health and personal care store services hospital services healthcare services health professionals services; and health services/HMO services.

Financial services including: accounting services; savings & loan services; securities, commodity contracts, and other financial investments and related activities services; social assistance savings & loan services; monetary authorities—central bank services; funds, trusts, and other financial vehicle services; insurance services; credit intermediation and related services; venture capital services; repair and maintenance social assistance savings & loan services; retail trade social assistance savings & loan services; scenic and sightseeing transportation social assistance savings & loan services; specialty trade contractor savings & loan services; sporting goods, hobby, book, and music store savings & loan services; support activities for mining savings & loan services; support activities for transportation savings & loan services; telecommunications savings & loan services; textile mills savings & loan services; trade, transportation, and utilities savings & loan services; transit and ground passenger transportation savings & loan services; transportation equipment manufacturing savings & loan services; transportation and warehousing savings & loan services; truck transportation savings & loan services; utilities savings & loan services; animal production credit intermediation and related services; commercial banks services; hedge fund services; finance/credit companies services; private equity & investment firm services; securities & investment services; and insurance & real estate services stock brokers/investment industry services.

Political services including: republican candidate committees services; republican leadership pacs services; republican/conservative services; women's issues services; defense/foreign policy advocates services; democratic candidate committees services; democratic leadership pacs services; democratic/liberal information services; candidate committee services; candidate committees, democratic services; candidate committees, republican services; gay & lesbian rights & issues services; gun control services; gun rights services; Israel policy services; pro-Israel services; lobbyist services; legal services; leadership PAC services; liberal/democratic services; and progressive/democratic services.

Union services including: airline unions services; building trades unions services; industrial unions services; public sector unions services; teacher unions services; transportation unions services; and government employee unions services.

Educational services including: university services; colleges & school services; Training services; tutoring services; teachers/education services; colleges, universities & schools services; for-profit education services; and student loan company services.

Food services including: vegetables & fruits services; wine, beer & liquor services; alcoholic beverages services; food & beverage services; food processing & sales services; food products manufacturing services; food manufacturing services; food services and drinking place services; food and beverage store services; and food stores services.

Transportation services including: automobile services; boat services; car rental services; limousine services; air transport services; road transport services; air transport unions organization services; airlines services; auto dealers services; auto dealers, Japanese services; auto manufacturers services; automotive services; car dealers, imports services; and car manufacturers services.

Healthcare services including: dental services; doctors & other health professional services; drug manufacturer services; weight control center services; general medical services; ENT (eye, nose and dental) services; and HMO services.

Manufacturing services including: leather and allied product manufacturing services; machinery manufacturing services; management of companies and enterprise services; merchant wholesalers, durable goods services; merchant wholesalers, nondurable goods services; mining (except oil and gas) services; mining, quarrying, and oil and gas extraction services; manufacturing services; store retailer services; motion picture and sound recording industry services; motor vehicle and parts dealer services; natural resources and mining services; nonmetallic mineral product manufacturing services; non-store retailer services; nursing and residential care facility services; oil and gas extraction services; paper manufacturing performing arts, spectator sports, and related industry services; personal and laundry services; petroleum and coal products manufacturing services; pipeline transportation services; plastics and rubber products manufacturing services; postal services; primary metal manufacturing services; printing and related support activity services; private household services; professional and business services; professional, scientific, and technical services; publishing industries (except internet) services; rail transportation services; real estate services; real estate and rental and leasing social assistance savings & loan services; religious grant making, civic, professional, and similar organization social assistance services; savings & loan services; rental and leasing services; warehousing and storage services; waste management and remediation services; water transportation savings & loan services; wholesale electronic markets and agents and brokers savings & loan services; wholesale trade savings & loan services; and wood product manufacturing savings & loan services.

Other services may include: advertising services; building services; general construction service: engineering services; bridal services; business services; catering services; on line check cashing services; consulting services; copyrighting & proof reading services; notary services; cover letter/resume services; dating services; decorating services; DJ services; dry cleaning & laundry services; editorial services; educational services; employment services; environmental services; errand services; fitness centers services; hair saloons services; home improvements services; lawn care & landscaping teachers unions services; maintenance services; nanny care services; message therapist services; moving services; painting services; personal care services; personal chef services; pest control services; pet care services; photography services; pool services; courier services; printing services; private investigation services; property inspection services; property management services; publishing services; real estate services; recreational services; referral services; modeling services; remodeling services/renovation services; security services; senior care services; staffing services; tanning services; tax services; tech services; information technology services; travel agency services; videotaping services; wedding services; agribusiness services; agricultural services & products services; agriculture services; alternative energy production services; architectural services; attorneys/law firms services; banking, mortgage services; banks, commercial services; banks, savings & loans services; bars & restaurants services; beer, wine & liquor services; books, magazines & newspapers services; broadcasters, radio/tv services; builders/general contractors services; builders/residential services; building materials & equipment services; building trade unions services; business associations services; business services; cable & satellite tv production & distribution services; casinos/gambling services; cattle ranchers/livestock services; chemical & related manufacturing services; chiropractors services; civil servants/public officials services; clergy & religious organizations services; clothing manufacturing services; coal mining services; commercial tv & radio stations services; communications/electronics services; computer software services; conservative/republican services; construction services; construction unions services; credit union services; crop production & basic processing services; cruise line services; cruise ships services; dairy services; defense services; defense aerospace services; defense electronics services; electric utility services; electronics manufacturing & equipment services; electronics, defense contractors services; energy & natural resources services; entertainment industry services; environment services; farm bureau services; farming services; for-profit prison services; foreign & defense policy services; forestry & forest products services; foundations, philanthropists & non-profit services; funeral services; gambling & casino services; gambling, Indian casino services; garbage collection/waste management services; gas & oil services; general contractor services; government employees services; home builders services; nursing home services; hotels, motels & tourism services; human rights services; ideological/single-issue services; Indian gaming services; industrial unions services; insurance services; internet services; liquor, wine & beer services; livestock services; lodging/tourism services; logging, timber & paper mill services; manufacturing services; marine transport services; meat processing & product services; medical supply services; mining services; business services; finance services; manufacturing & distributing services; unions services; defense services; mortgage bankers & broker services; motion picture production & distribution services; music production services; natural gas pipelines services; newspaper, magazine & book publishing services; non-profits, foundations & philanthropist services; nurse services; nursing homes/hospital services; nutritional & dietary supplement services; oil & gas services; payday lender services; pharmaceutical manufacturing services; pharmaceuticals/health product services; phone company services; physicians & other health professional services; postal union services; poultry & egg services; power utilities services; printing & publishing services; professional sports, sports arenas & related equipment & services; public employee services; public sector union services; publishing & printing services; radio/tv station services; railroad services; real estate services; record companies/singers services; recorded music & music production services; recreation/live entertainment services; religious organizations/clergy services; residential construction services; restaurants & drinking establishments services; retail sales services; retirement services; scientific and economic consulting services; sea transport services; special trade contractors services; sports, professional services; steel production services; sugar cane & sugar beets: telecom services & equipment services; telephone utilities services; textiles services; timber, logging & paper mills services; tobacco services; trash collection/waste management services; trucking services; tv/movies/music services; tv production services; waste management services; laboratory testing services; packaging & shipping services; accommodation services; accommodation and food services; administrative and support services; administrative and support and waste management and remediation services; agriculture, forestry, fishing and hunting services; ambulatory health care services; amusement, gambling, and recreation industry credit intermediation and related services; apparel manufacturing credit intermediation and related services; arts, entertainment, and recreation credit intermediation and related services; beverage and tobacco product manufacturing credit intermediation and related services; broadcasting (except internet) credit intermediation and related services; building material and garden equipment and supplies dealer credit intermediation and related services; chemical manufacturing clothing and clothing accessories store credit intermediation and related services; computer and electronic product manufacturing construction credit intermediation and related services; construction of building credit intermediation and related services; couriers and messenger credit intermediation and related services; crop production services; data processing, hosting, and related services: education and health services; educational services; electrical equipment, appliance, and component manufacturing services; electronics and appliance store services; fabricated metal product manufacturing services; fishing, hunting and trapping services; forestry and logging services; furniture and home furnishings store services; furniture and related product manufacturing services; gasoline station services; general merchandise store services; heavy and civil engineering construction services; information services; insurance carriers and related services; internet publishing and broadcasting services; leisure and hospitality services; own registered agent with referral services; and lessors of nonfinancial intangible assets (except copyrighted works, in one embodiment) services.

In accordance with another aspect of the disclosure, there is provided a service provider referral service providing maintenance contracts for periods of time, for example for a number of months, or a year or a number of years. Service providers may bid on the maintenance contracts in the same manner as single task contracts, and the maintenance contracts may be periodically re-bid.

In accordance with yet another aspect of the disclosure, there is provided a service provider referral service including reviews of service providers. The reviews may or may not identify the service provider until the customer selects the service provider to perform the services. The reviews may include satisfaction with work, cost, or completing time. The reviews may further include reports of erratic behavior, intoxication, or any undesirable behavior. Further, crimes reported following home services may be tracked to watch for a correlation between a given service provider and criminal activity.

In accordance with still another aspect of the disclosure, there is provided a service provider referral service contract to customers. Customers often fail to obtain signed contracts for service provider services. The contracts provides guidelines for resolving any disputes which may arise from the service provider work. Contracts may or may not include the time to complete the service and may or may not includes materials.

In accordance with yet another aspect of the disclosure, there is provided a service provider referral service maintaining and providing service provider license and insurance information to customers. Customers are often exposed to risks from damage to adjacent property and injuries to service provider employees. These risks are mitigated if the service provider is insured and maintains proper licenses. Recommendations may be provided to add the customer as an additional insured on the contractor's insurance to mitigate risks. If a service provider does not carry adequate insurance the referral service may offer referrals to insurance providers. Additional insurance coverage from the service provider or from outside insurance agencies may be offered at nominal rates. The insurance may include coverage for mechanic's liens on the customer's property.

In accordance with still another aspect of the disclosure, there is provided a service provider referral service providing referrals to residential, commercial, non-profit companies and/or government agencies for small and/or large projects. Customers having smaller projects may be referred to local service providers and customers having large projects may be referred to more distant service providers to better match customers to service providers.

In accordance with still another aspect of the disclosure, there is provided a service provider referral service providing tracking of service provider location. Often urgent repairs are required, for example, broken pipes. The referral service may provide real time service provider location providing peace of mind to the customer, and an opportunity to select an alternate service provider if the contractor's location is not consistent with receiving timely repairs.

In accordance with yet another aspect of the disclosure, there is provided a service provider referral service providing automated tracking and reassignment of service providers. If a service provider has been selected but has gotten behind on other work, the system automatically reevaluates the expected arrival and start of work, and offers alternate service providers. When a service provider has multiple tasks scheduled, the system monitor progress and sends updated times to the customer during the day, so the customer knows when to expect the service provider to arrive at the work site.

In accordance with another aspect of the disclosure, there is provided a service provider referral service providing options for hourly, daily, or weekly rates, or rates for the contracted repairs. Payments may be made directly to the service provider, or the referral service may collect and disburse payments to the service provider and the service provider referral service may maintain records of progress, completion and payments to the service provider. Customers failing to timely pay for services may be excluded from using the referral service until all payments have been made.

In accordance with yet another aspect of the disclosure, there is provided a service provider referral service allowing service providers to bid for work. Service provider information and their bid are forwarded to the customer.

In accordance with still another aspect of the disclosure, there is provided a service provider referral service charging either customers or service providers for using the service, and the charges may be fixed or based on the type of service or the cost of the service, or may be a percentage of contract price, and may be a fee for continued use of the referral service, or a one time fee when the contactor enters into a contract with a customer provided through the referral service. The service may further referral fee for materials purchased based on referral.

In some embodiments, there can be a method for providing contractor recommendations that includes: receiving contractor information including: services provided information; contractor license information; and contractor location; cataloging the contractor information; monitoring contractor performance; receiving customer enquiries including services required and services location; matching the contractors to the services based on both the services required, the services location, and the contractor location; providing contractor information to customers; and receiving customer feedback on contractor performance.

Also, the method(s) can include the following: the matching contractors to services comprises matching the contractors having contractor locations close to the services location for small services and matching contractors not as close to the services location for more expensive services; the matching contractors to services comprises matching the contractors having contractor locations close to the services location for services requiring heavy equipment and matching contractors not as close to the services location for the services not requiring heavy equipment; including receiving contractor insurance information; including evaluating the contractor insurance information and offering additional insurance; including evaluating the contractor insurance information and evaluating risks to contractor employee injury and determining if contractor insurance protects the customer from liability for the contractor employee injury; including evaluating the contractor insurance information and evaluating risks to neighboring property and determining if contractor insurance protects the customer from liability for damage to the neighboring property; including requiring the contactor to add the customer as an addition insured to a contractor insurance policy and provide a certificate showing the insurance customer as an additional insured to the customer; including providing real time contractor location to a customer; including monitoring real time contractor location and providing alerts to a customer if the contractor location is not consistent with the contractor satisfying service timeliness; including monitoring real time contractor location and providing alternative contractors to a customer if the contractor location is not consistent with the contractor satisfying service timeliness; including contractor behavior in customer feedback; including monitoring break-ins at the services locations and following contractor work and determining if more than typical break ins are occurring near the services location of the contractor work; including providing service provider history/record to a customer when the customer logs into the service; the providing contractor information to customers includes providing bids from more than one contractor to perform the services; including providing bids including discounts for customers not requiring immediate service; and/or the receiving customer enquiries includes a minimum time for performance of the required service; including confirming the contractor license information.

What is claimed is:

1. A computer-implemented method of generating and presenting interactive search results based on recommended service providers, the computer-implemented method comprising:

providing, by a computer system to a customer system associated with a customer, a user interface that comprises functionality that enables the customer to search for and interact with service providers available for a particular service, and wherein the computer system comprises a computer processor and electronic memory;

maintaining, by the computer system, one or more electronic data stores that store customer information relating to the customer;

maintaining, by the computer system, one or more electronic data stores that store service provider information relating to a plurality of service providers, wherein service provider information for an individual service provider comprises a plurality of service provider data fields, wherein one or more of the plurality of service provider data fields identify criteria set by the individual service provider for accepting work requests from customers via the computer system;

receiving, by the computer system based on user interaction with the user interface, electronic search data indicating search criteria for searching at least a subset of the plurality of service providers to perform a desired service, wherein the search criteria includes a plurality of search data fields, wherein the plurality of search data fields includes a project location indicating where the desired service is to be performed;

selecting, using the computer system, a set of service providers from the plurality of service providers, wherein at least one of the service provider data fields stored in the one or more electronic data stores for each service provider in the set of service providers matches one of the search data fields received by the computer system based on user interactions with the user interface;

receiving, by the computer system, service provider location data for each of the set of service providers, wherein the service provider location data comprises a current location for each service provider of the set of service providers;

calculating, using the computer system, a base score for each of a plurality of search data fields received by the computer system based on user interactions with the user interface for each service provider in the set of service providers, wherein the base score for an individual search data field received by the computer system based on user interactions with the user interface represents a similarity between values associated with the individual search data field received by the computer system based on user interactions with the user interface and a corresponding service provider data field stored in the one or more electronic data stores, wherein at least one base score for each individual service provider is based at least in part on a calculated distance from the project location to the current location of the individual service provider;

adjusting, using the computer system, the calculated base scores for each service provider in the set of service providers to generate adjusted base scores, wherein adjusting the base scores comprises at least one of (a) normalizing base scores or (b) applying one or more weights to the base scores based on relative importance of respective search data fields received by the computer system based on user interactions with the user interface;

calculating, using the computer system, a matching score for each service provider in the set of service providers, wherein calculating a first matching score for a first service provider is based at least in part on one or more adjusted base scores for the first service provider;

determining, using the computer system, a set of recommended service providers wherein the set of recommended service providers is a subset of the set of service providers, the set of recommended service providers determined based at least in part on the calculated matching scores for each service provider in the set of service providers;

in response to the receiving of electronic search data, and prior to any further user interaction with the user interface, causing display, via the user interface, of an interactive result set based at least in part on the set of recommended service providers, wherein:
  the interactive result set is determined and sorted based at least in part on the calculated matching scores,
  the interactive result set is displayed in the user interface within a graphical map view,
  the graphical map view depicts a real world geographic area and includes display of a plurality of graphical indicators that each represent a different recommended service provider from the set of recommended service providers, and
  a displayed location within the graphical map view of a first recommended service provider represents a real time physical location of the first recommended service provider within the real world geographic area as determined from real time location data received from at least one of a mobile device or GPS unit associated with the first recommended service provider;

receiving, by the computer system via the user interface, a work request for work to be performed by a selected service provider from the recommended service providers as displayed in the interactive result set; and sending, by the computer system in real time with respect to receipt of the work request, service request information to a first service provider system associated with the selected service provider, wherein the service request information includes at least a portion of the customer information relating to the customer.

2. The computer-implemented method of claim 1, wherein the relative importance of respective search data fields is determined based on user preferences associated with the customer.

3. The computer-implemented method of claim 1, further comprising:
  receiving, using the computer system, an indication of payment-related data, wherein the payment-related data indicates method and form of payment for a service offered by the selected service provider; and
  transmitting, using the computer system, the indication of a selection to the first service provider system associated with the selected service provider.

4. The computer-implemented method of claim 3, further comprising:
  generating, using the computer system, a contract based at least in part on the search criteria, service provider information, and customer information;
  transmitting, using the computer system, the contract to the customer system; and
  transmitting, using the computer system, the contract to the first service provider system.

5. The computer-implemented method of claim 4, wherein the contract includes a plurality of contractual terms automatically selected or generated based on information associated with at least one of the customer, the selected service provider or the work request.

6. The computer-implemented method of claim 5, further comprising:
  receiving, using the computer system, indication of acceptance of the contract from the customer system; and
  receiving, using the computer system, indication of acceptance of the contract from the first service provider system.

7. The computer-implemented method of claim 6, further comprising:
  continuously receiving, by the computer system from the first service provider system, electronic data indicating a current physical location of the first service provider system; and
  causing display, via the user interface, of a geographical map including an indicator on the graphical map representing the current physical location of the service provider, wherein the current physical location is based at least in part on the received electronic data, and wherein the display is updated at a predetermined time interval to stay up-to-date so that a customer can view the current physical location to see when the selected service provider associated with the first service provider system should be ready to perform the desired service.

8. The computer-implemented method of claim 3, further comprising:
  receiving, using the computer system, indication of a change order request from the first service provider system; and
  transmitting, using the computer system, the indication of the change order request to the customer system.

9. The computer-implemented method of claim 8, further comprising:
  receiving, using the computer system, indication of acceptance of the change order request from the customer system; and
  transmitting, using the computer system, the indication of acceptance to the first service provider system.

10. The computer-implemented method of claim 1, further comprising:
  receiving, using the computer system, bid information from one or more service provider systems associated with one or more service providers, wherein the bid information includes a price to perform work associated with the received electronic search data, and wherein the interactive result set displayed on the user interface includes at least a portion of the bid information so that a customer can consider the bid information when making a decision on which service provider to select.

11. The computer-implemented method of claim 1, wherein the graphical map view further includes display of a graphical indicator representing a geographic location of a home or other property at which work is to be performed in association with the work request.

12. The computer-implemented method of claim 1, wherein the interactive result set based at least in part on the set of recommended service providers is configured to allow the customer to select one or more service providers from the interactive result set to engage with for the desired service.

13. A system for generating and presenting interactive search results based on recommended service providers, the system comprising:
one or more electronic data stores comprising:
electronic search data including a plurality of search data fields;
customer information relating to a customer; and
service provider information relating to a plurality of service providers, wherein service provider information for an individual service provider comprises a plurality of service provider data fields and service provider location data, wherein one or more of the plurality of service provider data fields identify criteria set by the individual service provider for accepting work requests from customers via the system, and wherein the service provider location data comprises a current location for individual service providers of the set of service providers;
a networking interface; and
a hardware processor configured to execute computer-executable instructions in order to:
provide, to a customer system associated with a customer, a user interface that comprises functionality that enables the customer to search for and interact with service providers available for a particular service;
receive customer information relating to the customer;
receive service provider information relating to a plurality of service providers;
receive, based on user interaction with the user interface, electronic search data indicating search criteria for searching at least a subset of the plurality of service providers to perform a desired service, wherein the plurality of search data fields includes a project location indicating where the desired service is to be performed;
select a set of service providers from the plurality of service providers, wherein at least one of the service provider data fields for each service provider in the set of service providers matches one of the search data fields;
receive service provider location data for each of the set of service providers;
calculate a base score for each of a plurality of search data fields for each service provider in the set of service providers, wherein the base score for an individual search data field represents a similarity between values associated with the individual search data field and a corresponding service provider data field, wherein at least one base score for each individual service provider is based at least in part on a calculated distance from the project location to the current location of the individual service provider;
adjust the calculated base scores for each service provider in the set of service providers to generate adjusted base scores, wherein adjusting the base scores comprises at least one of (a) normalizing base scores or (b) applying one or more weights to the base scores based on relative importance of respective search data fields;
calculate a matching score for each service provider in the set of service providers, wherein calculating a first matching score for a first service provider is based at least in part on one or more adjusted base scores for the first service provider;
determine a set of recommended service providers, wherein the set of recommended service providers is a subset of the set of service providers, the set of recommended service providers determined based at least in part on the calculated matching scores for each service provider in the set of service providers;
in response to the receiving of electronic search data, and prior to any further user interaction with the user interface, cause display, via the user interface, of an interactive result set based at least in part on the set of recommended service providers, wherein:
the interactive result set being determined and sorted based at least in part on the calculated matching scores,
the interactive result set is displayed in the user interface within a graphical map view,
the graphical map view depicts a real world geographic area and includes display of a plurality of graphical indicators that each represent a different recommended service provider from the set of recommended service providers, and
a displayed location within the graphical map view of a first recommended service provider represents a real time physical location of the first recommended service provider within the real world geographic area as determined from real time location data received from at least one of a mobile device or GPS unit associated with the first recommended service provider;
receive, via the user interface, a work request for work to be performed by a selected service provider from the recommended service providers as displayed in the interactive result set; and
send, in real time with respect to receipt of the work request, service request information to a first service provider system associated with the selected service provider, wherein the service request information includes at least a portion of the customer information relating to the customer.

14. The system of claim 13, wherein the relative importance of respective search data fields is determined based on user preferences associated with the customer.

15. The system of claim 14, wherein the hardware processor is further configured to execute the computer-executable instructions in order to:
receive an indication of payment-related data, wherein the payment-related data indicates method and form of payment for a service offered by the selected service provider; and
transmit the indication of a selection to the first service provider system associated with the selected service provider.

16. The system of claim 15, wherein the hardware processor is further configured to execute the computer-executable instructions in order to:
generate a contract based at least in part on the search criteria, service provider information, and customer information, wherein the contract includes a plurality of contractual terms automatically selected or generated based on information associated with at least one of the customer, the selected service provider or the work request;
transmit the contract to the customer system; and
transmit the contract to the first service provider system.

17. The system of claim 16, wherein the hardware processor is further configured to execute the computer-executable instructions in order to:
- receive indication of acceptance of the contract from the customer system; and
- receiving indication of acceptance of the contract from the first service provider system.

18. The system of claim 17, wherein the hardware processor is further configured to execute the computer-executable instructions in order to:
- continuously receive, by the computer system from the first service provider system, electronic data indicating a current physical location of the first service provider system; and
- cause display, via the user interface, of a geographical map including an indicator on the graphical map representing the current physical location of the service provider, wherein the current physical location is based at least in part on the received electronic data, and wherein the display is updated at a predetermined time interval to stay up-to-date so that a customer can view the current physical location to see when the selected service provider associated with the first service provider system should be ready to perform the desired service.

19. The system of claim 13, wherein the hardware processor is further configured to execute the computer-executable instructions in order to:
- receive bid information from one or more service provider systems associated with one or more service providers, wherein the bid information includes a price to perform work associated with the received electronic search data, and wherein the interactive result set displayed on the user interface includes at least a portion of the bid information so that a customer can consider the bid information when making a decision on which service provider to select.

20. The system of claim 13, wherein the graphical map view further includes display of a graphical indicator representing a geographic location of a home or other property at which work is to be performed in association with the work request.

* * * * *

UNITED STATES PATENT AND TRADEMARK OFFICE
CERTIFICATE OF CORRECTION

PATENT NO. : 10,600,105 B1
APPLICATION NO. : 16/543402
DATED : March 24, 2020
INVENTOR(S) : Rajiv Kumar It is certified that error appears in the above-identified patent and that said Letters Patent is hereby corrected as shown below:

In Column 47, Line 10, Claim 1, delete "providers" and insert --providers,--.

Signed and Sealed this
Sixteenth Day of June, 2020

Andrei Iancu
*Director of the United States Patent and Trademark Office*